US00RE39305E

(19) United States
(12) Reissued Patent
DeMoore et al.

(10) Patent Number: US RE39,305 E
(45) Date of Reissued Patent: Sep. 26, 2006

(54) ANTI-STATIC, ANTI-SMEARING PRE-STRETCHED AND PRESSED FLAT, PRECISION-CUT STRIPED FLEXIBLE COVERINGS FOR TRANSFER CYLINDERS

(76) Inventors: Howard Warren DeMoore, 10954 Shady Trail, Dallas, TX (US) 75220; John Andrew Branson, 607 Duncan Dr., Coppell, TX (US) 75019

(21) Appl. No.: 10/352,334

(22) Filed: Jan. 27, 2003

(Under 37 CFR 1.47)

Related U.S. Patent Documents

Reissue of:
(64) Patent No.: 6,244,178
Issued: Jun. 12, 2001
Appl. No.: 09/255,459
Filed: Feb. 22, 1999

U.S. Applications:
(63) Continuation of application No. 08/581,068, filed on Dec. 29, 1995, now Pat. No. 5,907,998.

(51) Int. Cl.
*B41F 21/00* (2006.01)

(52) U.S. Cl. ..... 101/401.1; 101/415.1; 101/493

(58) Field of Classification Search ..... 101/220, 101/229, 230, 231, 232, 378, 382.1, 383, 101/415.1, 416.1, 419, 420, 483, 492, 493, 101/401.1
See application file for complete search history.

(56) References Cited

U.S. PATENT DOCUMENTS 3,060,853 A * 10/1962 Remer
3,235,772 A * 2/1966 Gurin (Continued)

FOREIGN PATENT DOCUMENTS

| | | | |
|---|---|---|---|
| DE | 29518877 | U | 2/1996 |
| EP | 0687561 | A | 12/1995 |
| EP | 0 687 561 | A1 * | 12/1995 |
| EP | 0723865 | A | 7/1996 |
| EP | 0723 865 | A1 * | 7/1996 |
| JP | 06247492 | | 3/1994 |

OTHER PUBLICATIONS

EP 96 25 0300 Partial European Search Report, Apr. 15, 1997.

EP 1 332 873 A3 European Search Report, Sep. 15, 2003.

*Primary Examiner*—Ren Yan
(74) *Attorney, Agent, or Firm*—Michael W. Piper; Conley Rose, P.C.

(57) ABSTRACT

Freshly printed sheets are transferred from one printing unit to another by transfer cylinders each having an ink repellent, electrically conductive, striped flexible jacket covering that is movable relative to the sheet support surface of the transfer cylinder. The jacket covering is made of a flexible fabric material that is pre-stretched, pressed flat, cut to size and treated with an ink repellent compound and is also treated with an anti-static ionic compound or is otherwise rendered electrically conductive by one or more conductive strands. Electrostatic charges carried by the freshly printed sheets are discharged through the ink repellent, electrically conductive, flexible jacket covering into the grounded transfer cylinder. A low friction, electrically conductive cylinder base covering that includes center alignment marks is secured to the transfer cylinder for engaging the flexible jacket covering. The ink repellent, electrically conductive flexible jacket covering is provided with alignment center marks and alignment stripes so that the flexible jacket covering can be precisely aligned with ease and secured over the gripper edge, tail edge and side edges of the transfer cylinder. The low frictional coefficient of the conductive cylinder base covering is further reduced by nodes and/or openings.

100 Claims, 11 Drawing Sheets

U.S. PATENT DOCUMENTS 3,791,644 A * 2/1974 DeMoore
4,227,459 A 10/1980 Jeschke ..... 101/415
4,402,267 A * 9/1983 DeMoore
4,599,943 A * 7/1986 Kobler
4,611,539 A * 9/1986 Ireton ..... 101/401.1
4,665,823 A * 5/1987 Hightower
4,673,380 A * 6/1987 Wagner
4,872,407 A * 10/1989 Banke ..... 101/389.1
5,042,384 A * 8/1991 DeMoore et al. ..... 101/483
5,090,686 A * 2/1992 Kemp et al. ..... 271/277
5,150,738 A 9/1992 Nishiwaki ..... 139/420 R
5,317,971 A * 6/1994 Deye et al. ..... 101/486
5,322,014 A * 6/1994 Keller ..... 101/415.1
5,413,044 A * 5/1995 Wu et al. ..... 101/420
5,415,098 A * 5/1995 Ward ..... 101/493
5,511,480 A * 4/1996 DeMoore et al.
5,842,412 A * 12/1998 Greenway et al. ..... 101/420
5,979,322 A * 11/1999 DeMoore et al. ..... 101/401.1
6,073,556 A * 6/2000 DeMoore et al. ..... 101/232
6,119,597 A * 9/2000 DeMoore et al. ..... 101/483

* cited by examiner

ANTI-STATIC, ANTI-SMEARING PRE-STRETCHED AND PRESSED FLAT, PRECISION-CUT STRIPED FLEXIBLE COVERINGS FOR TRANSFER CYLINDERS

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation of prior U.S. patent application Ser. No. 08/581,068 filed Dec. 29, 1995, now U.S. Pat. No. 5,907,998 entitled as above by the same inventors for which benefit under 35 USC § 120 is claimed.

FIELD OF THE INVENTION

This invention concerns method and apparatus for reducing marking and smearing of freshly printed substrate material in a printing press.

BACKGROUND OF THE INVENTION

In the operation of a multi-unit rotary offset printing press, freshly printed substrates such as sheets or web material are guided by transfer cylinders or the like from one printing unit to another, and then they are delivered to a sheet stacker or to a sheet folder/cutter unit, respectively. Transfer cylinders are known by various names including delivery cylinders, transfer rollers, support rollers, delivery wheels, skeleton wheels, segmented wheels, transfer drums, support drums, spider wheels, support wheels, guide wheels, guide rollers and the like. The ink marking problems inherent in transferring freshly printed substrates have been longstanding. In order to minimize the contact area between the transfer means and the freshly printed substrate, conventional support wheels have been modified in the form of relatively thin disks having a toothed or serrated circumference, referred to as skeleton wheels. However, those thin disc transfer means have not overcome the problems of smearing and marking the freshly printed substrate due to moving contact between the freshly printed substrate and the projections or serrations. Moreover, the attempts to minimize the surface support area in contact with the freshly printed substrate material has also resulted in actual indenting or dimpling of the substrate itself.

DESCRIPTION OF THE PRIOR ART

Various efforts have been made to overcome the limitations of thin disk skeleton wheels. One of the most important improvements has been completely contrary to the concept of minimizing the surface area of contact. That improvement is disclosed and claimed in my U.S. Pat. No. 3,791,644 to Howard W. DeMoore wherein the support surface of a transfer cylinder in the form of a wide wheel or cylinder is coated with an improved ink repellent surface formed by a layer of polytetrafluoroethylene (PTFE).

During the use of the PTFE coated transfer cylinders in high speed commercial printing presses, the surface of the coated cylinders must be washed too frequently with a solvent to remove any ink accumulation. Moreover, it has also been determined that the PTFE coated cylinders do not provide a critically needed cushioning effect and relative movement.

The limitations on the use of the PTFE coated transfer cylinders have been overcome with an improved transfer cylinder having an ink repellent, cushioning and supportive fabric covering or the like for transferring the freshly printed sheet. It is now well recognized and accepted in the printing industry world-wide that marking and smearing of freshly printed sheets caused by engagement of the wet printed surface with the supporting surface of a conventional press transfer cylinder is substantially eliminated by using the anti-marking fabric covering system as disclosed and claimed in my U.S. Pat. No. 4,402,267 entitled "Method and Apparatus for Handling Printed Substrate Material", the disclosure of which is incorporated herein by reference.

That system, which is marketed under license by Printing Research, Inc. of Dallas, Tex., U.S.A. under the registered trademark SUPER BLUE®, includes the use of a low friction coating on the supporting surface of the transfer cylinder, and over which is loosely attached a movable fabric covering. The original fabric covering provided a yieldable, cushioning support for the freshly printed side of the substrate such that relative movement between the freshly printed substrate and the transfer cylinder surface would take place between the original fabric covering and the support surface of the transfer cylinder so that marking and smearing of the freshly printed surface was substantially reduced.

The original SUPER BLUE® transfer cylinder and fabric covering system has achieved world-wide commercial success; however, with continuous use such as is common in printing presses, there is over a period of use an accumulation of ink on the fabric covering, which is now believed to be caused in major part by static electricity. The original SUPER BLUE® fabric covering is constructed of a stretchable cotton cheesecloth material that has ridges, furrows, rows and wrinkles. Alter extended use, the original stretchable cotton cheesecloth covering requires re-adjustment and tightening to provide the proper amount of relative movement of the fabric covering relative to the transfer cylinder surface. After extended use without such re-adjustment, the cotton cheesecloth fabric covering becomes so loose that it will be caught on press parts and torn off of the cylinder.

Modern printing presses have been constructed with closer clearance between the impression cylinder and the transfer cylinder in the expectation that sheet registration will improve. However, the close cylinder clearance has not improved registration and has actually made the marking problem worse. Consequently, there has been continuing development in the design of the fabric covering to eliminate the problems caused by static electricity, stretchability of the fabric covering the close cylinder clearances.

Lengthy investigation and testing have revealed the build-up of electrostatic charges on the fabric covering as the handicapping factor that has prevented completely free movement of the fabric covering. The electrostatic charge build-up also appears to accelerate the accumulation of ink deposits so that the fabric covering becomes ink encrusted faster. The build-up of the static electric charge on the fabric covering is caused by "frictional electricity", which is the transfer of electrons from one material to another when they are pressed or rubbed together. This occurs in a printing press as the moving substrate contacts the stationary parts of the press.

According to one theory, the transfer of electrostatic charges between two contacting dielectrics, such as a fabric covering and paper, plastic or other printed material, is proportional to the difference between their dielectric constants, with the electrostatic charge moving from the material having the lower dielectric constant to the material having the higher dielectric constant. Since a fabric covering of the woven type typically used in the original SUPER BLUE® cylinder covering system has a higher dielectric constant as compared to the dielectric constant of a sheet of paper, for example, the electrostatic charge picked up by the freshly printed sheet from frictional contact with press parts as the sheet material travels through the press is conducted onto the fabric covering as the sheet is transferred over the transfer cylinder.

Transfer cylinders whose transfer surfaces are covered by a synthetic or natural organic resin, for example as disclosed in my U.S. Pat. No. 4,402,267, have a low-friction surface and also have insulating, dielectric properties which make them an accumulator of electrostatic charges carried by the freshly printed sheet material. That is, the electrical charges that are conducted from the freshly printed sheets to the fabric covering are also conducted to the underlying low friction, cylinder base covering. As a result of such electrostatic charge transfer and accumulation on both the fabric covering and the cylinder base covering, the fabric covering clings to the underlying cylinder base covering and cannot move freely because of the force of electrostatic attraction between the fabric covering and the cylinder base covering.

The resultant build-up of electrostatic charges on the fabric covering also appears to make the fabric covering more attracted to the freshly printed image area, with the result that the ink accumulation and encrusting action is accelerated. Consequently, the original SUPER BLUE® fabric covering must be replaced more frequently. Additionally, the build-up of electrostatic charges on the fabric covering makes it cling to the cylinder base covering, thereby preventing completely free movement of the fabric covering.

In the original SUPER BLUE® fabric covering, the fabric covering was very stretchable, and its surface was wrinkled with furrows, rows and ridges. The original SUPER BLUE® fabric covering was loosely attached over the entire support surface of the transfer cylinder, and required trimming to remove excess material for proper attachment. The original SUPER BLUE® fabric covering has performed with good results. However, in some press installations the side and tail edges of the original SUPER BLUE® fabric covering have become encrusted with dried ink, particularly where small size sheets have been printed. The ink is picked up on the side and tail edges of the original fabric covering as a result of slapping contact against the impression cylinder. Gum arabic is picked up from the fountain solution and ink is also picked up from the non-image areas of the printing plate, then transferred to the blanket, then transferred to the impression cylinder, and thereafter transferred onto the fabric covering. The dried ink accumulation on the side edges and tail of the fabric covering and cause the fabric covering to be unusable for transferring freshly printed larger size sheets without marking or smearing, therefore requiring replacement of the original fabric covering.

SUMMARY OF THE INVENTION

The present invention provides an improved method and apparatus for transferring substrate material in sheet form or in web form that has been freshly printed on at least one side wherein the substrate material is supported by a movable, ink repellent and electrically conductive covering or jacket of flexible material is attached to the transfer cylinder. In accordance with one aspect of the present invention, the build-up of electrostatic charges on the movable, flexible jacket covering is prevented by including one or more conductive elements in the jacket covering material, or by treating the jacket covering with an anti-static ionic polymer compound, that make the jacket covering electrically conductive. According to these improvements, electrostatic charges delivered to the flexible jacket covering by frictional contact with the freshly printed substrate material are in turn drawn off and discharged through the low frictional coefficient, conductive cylinder base covering into the transfer or delivery cylinder. Consequently, the build-up or accumulation of electrostatic charges on the flexible, ink repellent conductive jacket covering cannot occur, since such charges are conducted immediately through the conductive cylinder base covering into the transfer cylinder and into the grounded frame of the printing press.

In accordance with another aspect of the present invention, movement of the ink repellent, conductive flexible jacket covering relative to the transfer cylinder is improved by a cylinder base covering of a conductive material, such as a metal foil or sheet, that is coated with a low frictional coefficient, semiconductive material. The cylinder base covering material has a frictional coefficient that is less than the frictional coefficient of the bare cylinder support surface. The frictional coefficient is further reduced by radially projecting surface portions, or by openings or holes formed in the cylinder base covering, that reduce the surface area of frictional engagement. In one embodiment, the surface of the cylinder base covering material is structurally differentiated and is characterized by radially projecting portions that reduce the amount of surface area for contact with the ink repellent, conductive flexible jacket covering. The structurally differentiated, radially projecting surface portions are provided by weft and warp strands of woven material in one embodiment, and by nodes or beads in another embodiment. The structurally differentiated cylinder base covering embodiments are useful for further reducing the frictional drag that occurs as a result of movement of the flexible jacket covering relative to the cylinder base covering.

According to yet another aspect of the present invention, an ink repellent, conductive and flexible jacket covering for the transfer cylinder comprises a woven fabric material having at least one conductive strand that makes the flexible jacket covering conductive, and the at least one conductive strand also defines a stripe for alignment purposes. The ink repellent, conductive jacket covering is supported on the low friction, conductive cylinder base covering to gently cushion any slight relative movement between the freshly printed substrate and the transfer cylinder surface without marking the freshly printed surface or damaging the substrate material itself.

According to another aspect of the present invention, the flexible jacket covering material is treated with an ionic polymer compound that renders the flexible jacket covering electrically conductive, referred to herein as "anti-static".

In accordance with still another aspect of the present invention, the cylindrical support surface of the transfer cylinder is covered by a conductive fluoropolymer resin that forms a low friction, electrically conductive supporting surface for the flexible jacket covering. Preferably, the surface of the conductive fluropolymer layer is structurally differentiated by nodes or beads, and is perforated by holes.

In accordance with a further aspect of the present invention, the ink repellent, conductive jacket covering is constructed of a flexible fabric material, preferably cotton cheesecloth, that is pre-stretched and pressed flat to remove all wrinkles, ridges, rows, furrows and the like.

According to a related aspect of the present invention, the flexible jacket covering material is cotton cheesecloth that has been pre-stretched, pressed flat and pre-cut to predetermined length and width dimensions, and is marked with one or more alignment stripes and one or more center alignment marks for simple and easy installation of the flexible jacket covering onto the transfer cylinder, without requiring measuring or trimming of the flexible jacket covering as it is being precisely aligned and attached onto the transfer cylinder. In this pre-cut embodiment, the transfer cylinder and/or the base cylinder covering is also marked with center alignment marks for facilitating proper attachment of the flexible jacket covering to the transfer cylinder in an operative position with the flexible jacket covering being precisely aligned and having the proper amount of relative movement or end play of the flexible jacket covering relative to the transfer cylinder support surface.

Those skilled in the art will understand the foregoing superior features as well as other aspects of the present invention upon reading the detailed description which follows with reference to the drawings.

DETAILED DESCRIPTION OF THE PREFERRED EMBODIMENTS

Figure 1:
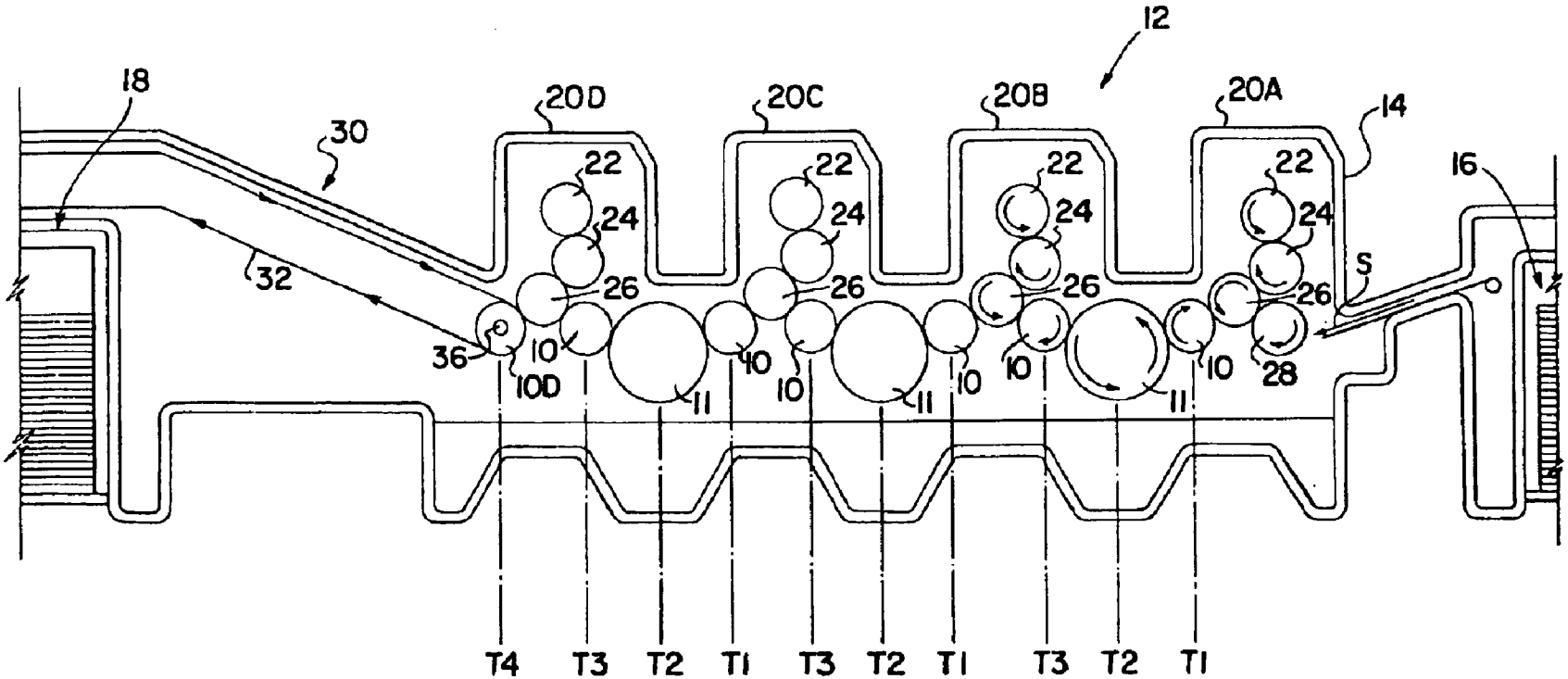
FIG. 1 is a schematic side elevational view showing multiple transfer cylinders of the present invention installed at interunit transfer positions in a four color rotary offset printing press.

The terminology "transfer cylinder" and "transfer means" as used herein means and refers to transfer cylinders, delivery cylinders, transfer rollers, support rollers, delivery wheels, skeleton wheels, segmented wheels, transfer drums, support drums, spider wheels, support wheels, guide wheels and any other rotatable members that are capable of transferring a freshly printed substrate in a printing press.

As used herein, "fluoropolymer" means and refers; to fluorocarbon polymers, for example polytetrafluoroethylene, polymers of chlorotrifluoroethylene, fluorinated ethylenepropylene polymers, polyvinylidene fluoride, hexafluoropropylene, and other elastomeric high polymers containing fluorene, also known and referred to as fluoroelastomers.

As used herein "conductive" or "elastically conductive" means and refers to the ability of a material to conduct or transfer an electrical charge by the passage of electrons or ionized atoms. The term "semi-conductive" refers to a conductive material whose surface resistivity at room temperature (70° F., 21° C.) is in the range of about $10^{-2}$ ohm-centimeter to about $10^{9}$ ohms-centimeter, which is between the resistivity of metals and insulators.

In the exemplary embodiments discussed below, the substrate S is described as being in sheet form. It will be understood, however, that the principles of the present invention is equally applicable to a printed substrate in web form.

The improved method and apparatus for handling freshly printed substrate material in accordance with the present invention is used in combination with high speed printing presses of the type used, for example, in offset printing. Such equipment typically includes one or more transfer cylinders 10 for transferring the freshly printed substrate material, either in sheet form or in web form, between printing units and from the last printing unit to a delivery stacker or a sheet folder/cutter unit, respectively. The particular location of the improved transfer cylinder 10 of the present invention at an interunit transfer position (T1, T3) or the improved delivery cylinder 10D at a delivery position (T4) in a typical four unit rotary offset printing press 12 as shown in FIG. 1 is believed to be understood stood by those skilled in the art.

Whether a particular cylinder is designated as being a transfer cylinder or delivery cylinder depends upon its construction and location within the press. Those transfer cylinders that are located at interunit transfer positions (T1, T3) are equipped with grippers for gripping a freshly printed sheet. In the delivery position (T4), the delivery cylinder 10D does not have grippers, but instead has a longitudinal pocket A to permit the passage of grippers carried by a delivery conveyor system. Reference should be made to my earlier U.S. Pat. Nos. 3,791,644 and 4,402,267 for details regarding the location and function of transfer and delivery cylinders in a typical multi-unit rotary offset printing press. The present invention can, of course, be utilized with printing presses having any number of printing units.

Referring to FIG. 1, the rotary offset press 12 includes a press frame 14 coupled on its right end to a sheet feeder 16 from which sheets, herein designated S, are individually and sequentially fed into the press, and at its delivery end, the press 12 is coupled to a sheet stacker 18 in which the freshly printed sheets are collected and stacked. Interposed between the sheet feeder 16 and the sheet stacker 18 are four substantially identical rotary offset sheet printing units 20A, 20B, 20C, and 20D that are capable of printing different color inks onto the sheets as they are transferred through the press.

As illustrated in FIG. 1, each printing unit is of conventional design, and includes a plate cylinder 22, a blanket cylinder 24 and an impression cylinder 26. Freshly printed sheet S are transferred from the impression cylinder to the next printing unit by a transfer cylinder 10. The first printing unit 20A is equipped with a sheet in-feed roller 28 that feeds individual sheets one at a time from the sheet feeder 16 to the impression cylinder 26 of the first printing unit 20A.

The freshly printed sheets S are transferred to the sheet stacker 18 by a delivery conveyor system, generally designated 30. The delivery conveyor system 30 is of conventional design and includes a pair of endless delivery gripper chains 32 carrying laterally disposed gripper bars, each bar having gripper elements for gripping the leading (gripper) edge of a freshly printed sheet S as it leaves the last impression cylinder 26 at the delivery position T4. As the gripper edge of the freshly printed sheet S is gripped by the delivery grippers, the delivery chains 32 pull the gripper bars and sheet S away from the impression cylinder 26 of the last printing unit 20D and delivery the freshly printed sheet S to the sheet delivery stacker 18.

An intermediate transfer cylinder 11 receives freshly printed sheets from the transfer cylinder 10 of the preceding printing unit. Each intermediate transfer cylinder 11, which is of conventional design, typically has a diameter twice that of the transfer cylinder 10, and is located at an intermediate position T2 between the interunit transfer positions T1, T3 of each printing unit as shown in FIG. 1. The impression cylinders 26, the intermediate transfer cylinders 11, the transfer cylinders 10, as well as the sheet in-feed roller 28, are each provided with sheet grippers which grip the leading (gripper) edge of the sheet S to pull the freshly printed sheet around the transfer cylinders 10 in the direction as indicated by the associated arrows. The delivery cylinder 10D in the delivery position T4 is not equipped with grippers, and includes instead a longitudinal pocket A that provides clearance for passage of the delivery gripper bars.

The function and operation of the transfer and delivery cylinders and associated grippers of the printing units are believed to be well known to those familiar with multi-unit or multi-color presses, and need not be described further except to note that in each printing unit, the impression cylinder 26 functions to press the sheets against the blanket cylinder 24 which applies ink to the sheets S. Each transfer cylinder 10 transfers the freshly printed sheets away from the impression cylinder 26 with the freshly printed side of each sheet facing the support surface of each transfer cylinder 10 and delivery cylinder 10D. According to the principal embodiment of the present invention, each transfer cylinder 10 and delivery cylinder 10D are provided with a cushioning ink repellent, anti-static or conductive flexible jacket covering, and preferably includes a low friction, electrically conductive cylinder base covering as described below.

Figure 2:
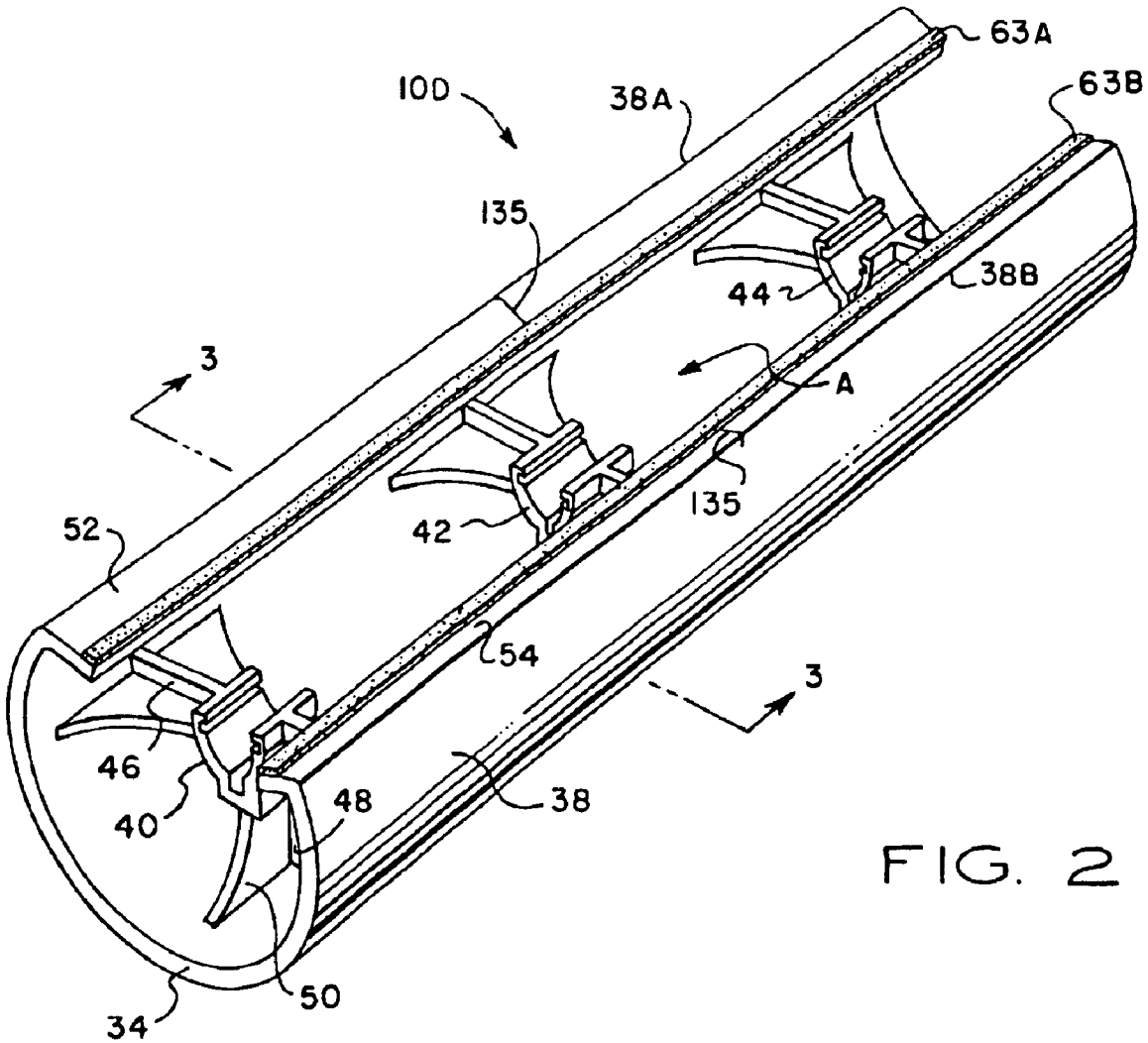
FIG. 2 is a perspective view of a delivery cylinder constructed according to the present invention showing a center alignment mark that is used for precision attaching a pre-cut, pre-stretched flat, ink repellent and conductive flexible jacket covering to the delivery cylinder.
Figure 3:
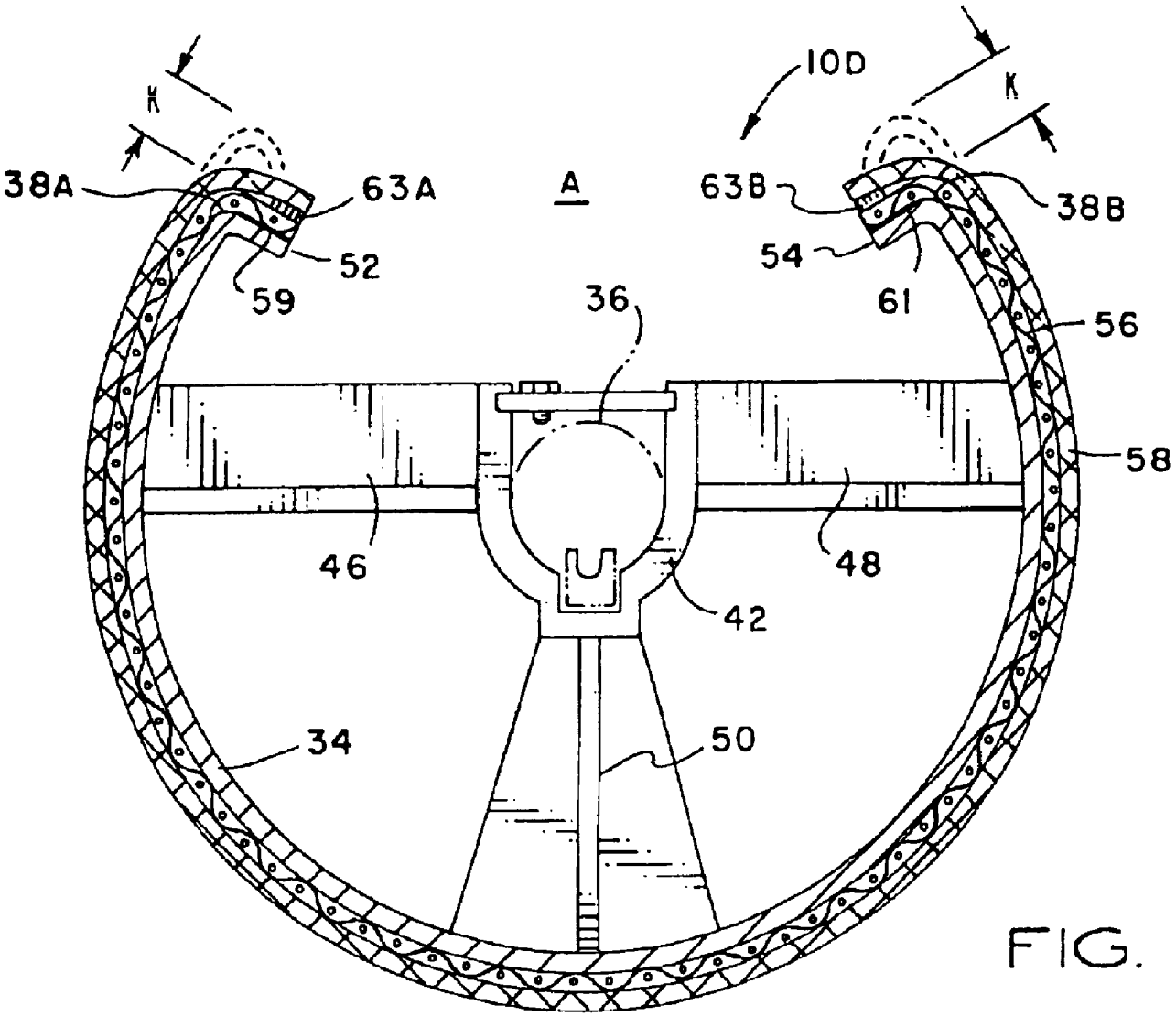
FIG. 3 is a sectional view thereof, taken along the line 3—3 of FIG. 2 showing the flexible jacket covering movably secured to the delivery cylinder in the operative position.

Referring now to FIG. 1, FIG. 2 and FIG. 3, an improved delivery cylinder 10D is installed on the last printing unit 20D of the press 12 in the delivery position (T4) and has a cylindrical rim 34 which is supported for rotation on the press frame 14 by a rotatable delivery shaft 36. The external cylindrical surface 38 of the cylindrical rim 34 has a pocket A extending longitudinally along the length of the delivery cylinder and circumferentially between gripper edge 38A and tail edge 38B, respectively. The delivery cylinder 10D is attached to the delivery shaft 36 by longitudinally spaced hubs 40, 42 and 44. Additionally, center alignment marks 130 are formed on the cylinder flanges portions 52, 54 and on the curved support surface 38 of the cylindrical rim 34, as shown in FIG. 2. The purpose of the center alignment marks 130 is to facilitate the precise alignment and attachment of the flexible jacket covering 58 to the transfer cylinder. Additionally, center alignment marks 130 are also formed on the cylinder base covering 60 for the same purpose.

The hubs 40, 42 and 44 are connected to the cylinder 34 by webs 46, 48 and 50, and support the delivery cylinder 10D for rotation on the delivery shaft 36 of the printing press 12 in a manner similar to the mounting arrangement disclosed in my U.S. Pat. No. 3,791,644. As shown in FIG. 2, the delivery cylinder 10D includes opposed elongated integral flanges 52, 54 which extend generally inwardly from the surface of the cylinder rim portion 34. The flanges 52 and 54 include elongated flat surfaces for securing a low coefficient of friction, flexible conductive cylinder base covering and a flexible, ink repellent conductive jacket covering as described below.

Referring now to FIG. 2, FIG. 3, FIG. 14 and FIG. 15, there is illustrated in detail the improved construction of the delivery cylinder 10D of the present invention including a low friction, conductive cylinder base covering 56 and a flexible, ink repellent and anti-static or conductive jacket covering 58 for cushioning the printed side of a freshly printed sheet S while transferring the freshly printed sheet to the next printing unit or to the press delivery stacker 18. Although the fluoropolymer covered delivery cylinder disclosed in my U.S. Pat. No. 3,791,644 and the ink repellent fabric covering disclosed in my U.S. Pat. No. 4,402,267 provided improvements in transferring freshly printed sheet material, we have discovered that the provision of an electrically conductive, low friction cylinder base covering further enhances the ability of each transfer cylinder 10 and delivery cylinder 10D to support and transfer successive sheets of freshly printed material thereon without transferring the wet ink from a previous sheet to successive sheets and without marking, smearing or indenting the surface of the freshly printed sheet.

Figure 14:
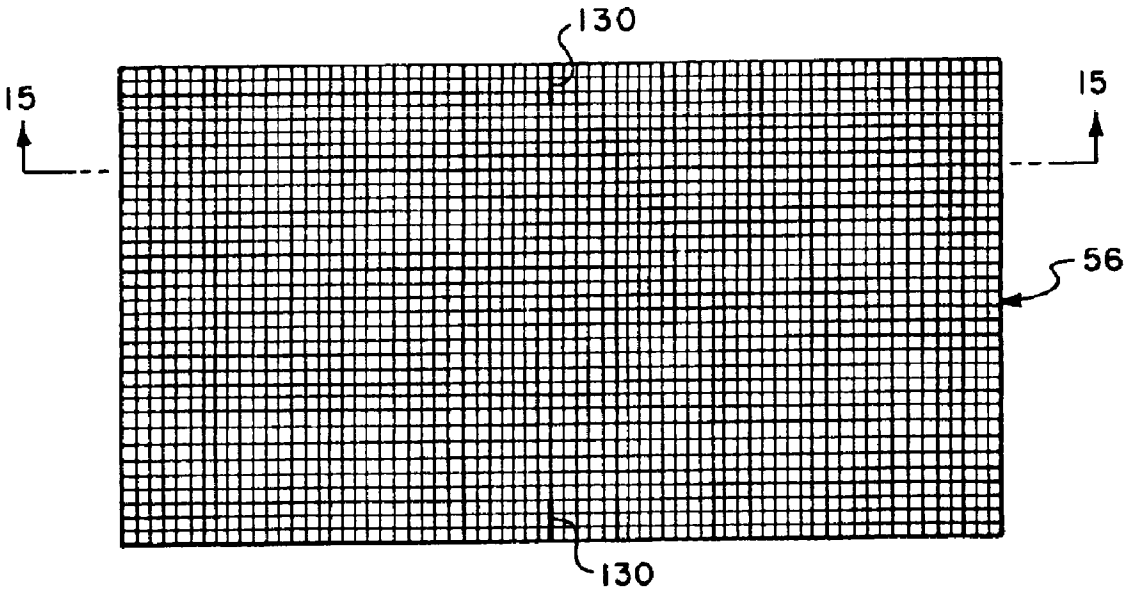
FIG. 14 is a top plan view showing an alternative embodiment of a low friction, conductive cylinder base covering with center alignment marks.
Figure 15:
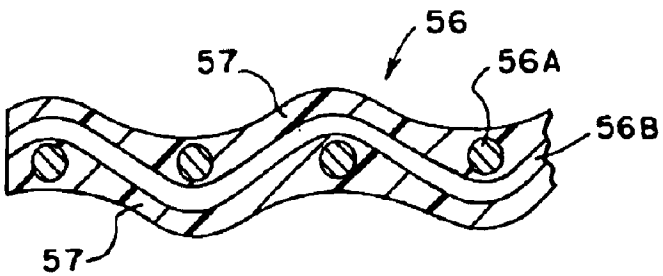
FIG. 15 is a sectional view thereof taken along the line 15—15 of FIG. 14; and, FIG. 16 is a top perspective view of an alternative embodiment of a flexible jacket covering constructed of electrically conductive, ink repellent polymer foam material, having alignment stripes and center alignment marks.

The low friction, conductive cylinder base covering 56 in accordance with the present invention and illustrated in the embodiment of FIG. 3, FIG. 14 and FIG. 15 comprises a woven material having warp and weft strands 56A, 56B are covered with a conductive compound 57. The low friction, conductive cylinder base covering 56 and the flexible, ink repellent conductive flexible jacket covering 58 are attached to the cylinder flanges 52 and 54 of the attachment end portions of the cylinder as shown in FIG. 3. Preferably, the flexible, ink repellent and anti-static jacket covering 58 and the low friction conductive cylinder base covering 56 are both preferably of rectangular shape. In this full length embodiment, the cylinder base covering 56 is dimensioned to completely cover the bare cylinder support surface 38 of the cylinder 34, and the ink repellent, conductive flexible jacket covering 58 is substantially co-extensive with the cylinder base covering 56.

Preferably, the conductive compound 57 is polytetrafluoroethylene resin (PTFE), for example as sold under the trademarks TEFLON and XYLAN. The cylinder base covering 56 comprises warp and weft (fill) strands 56A, 56B of polyamide fiberglass, woven together in a base fiber thickness of approximately 0.007 inch (approximately 0.2 mm). The woven material is coated with conductive PTFE resin to a finished thickness in the range of 0.009–0.011 inch (0.2 mm–0.3 mm), a finished weight in the range of 17–20 ounces per square yard (56–63 dynes/sq.cm.), with a tensile strength of approximately 400×250 warp and weft (fill) pounds per square inch ($281\times10^3$–$175\times10^3$ kg/sqm). In one embodiment, the polyamide fiber comprises woven fiberglass filaments 56A, 56B covered by conductive PTFE. The PTFE resin contains electrically conductive carbon black, or some other equivalent conductive agent such as graphite or the like, preferably in an amount sufficient to provide a surface resistivity not exceeding approximately 100,000 ohms/square.

While polyamide strands 56A, 56B covered or coated with polytetrafluoroethylene (PTFE) resin or a fluorinated ethylene propylene (FEP) resin impregnated with carbon black are preferred, other synthetic or natural organic resins including linear polyamides such as sold under the trade name NYLON, linear polyesters such as polyethylene terephthlate sold under the trade name MYLAR, hydrocarbon or halogenated hydrocarbon resins such as polyethylene, polypropylene or ethylene-propylene copolymers, and acrylonitrile butadinene styrene (ABS) have a low coefficient of friction surface and can also be combined with a conductive agent, such as carbon black, graphite or the like, to render the resin compound 57 electrically conductive.

In the preferred embodiment, the surface resistivity of the conductive cylinder base coverings 56, 60 does not exceed approximately 75,000 ohms per square. Other surface resistivity values may be used to good advantage, for example in the surface resistivity range of 50,000 ohms per square to 100,000 ohms per square. The coefficient of friction and conductivity of the cylinder base covering material are influenced by the amount of the conductive agent present in the conductive compound 57. Consequently, the amount of conductive agent included in the fluoropolymer resin for a given conductivity or surface resistivity will necessarily involve a compromise with the coefficient of friction. Generally, high conductivity (low surface resistivity) and low coefficient of friction are desired. Preferably the amount of conductive agent contained in the fluoropolymer resin is selected to provide a surface resistivity not exceeding approximately 75,000 ohms/square and a coefficient of friction not exceeding approximately 0.110.

Figure 4:
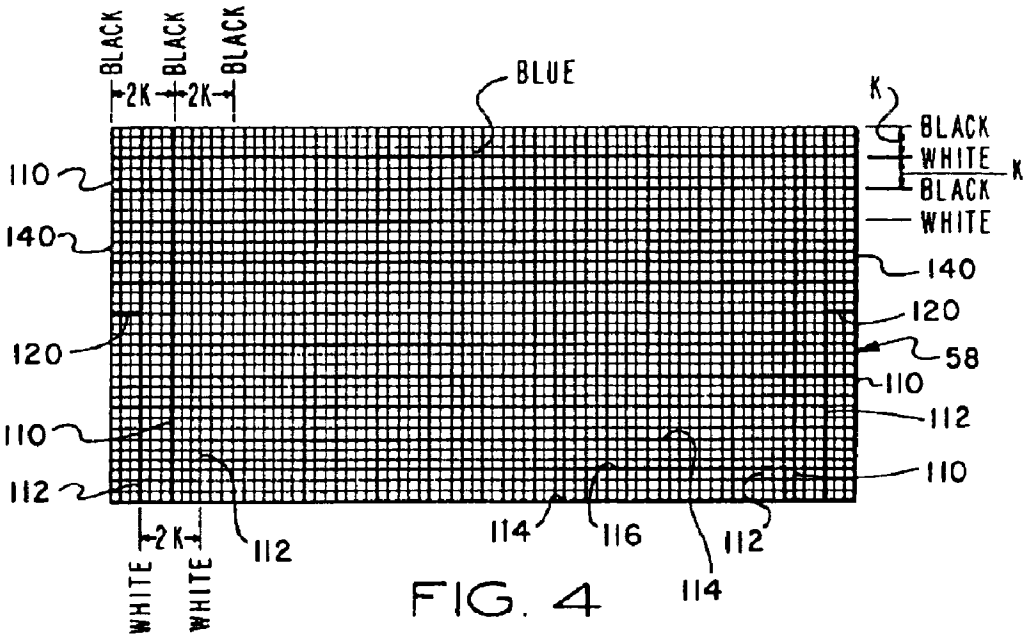
FIG. 4 is a top plan view of a conductive, ink repellent flexible jacket covering having center alignment marks and having alignment stripes.
Figure 6:
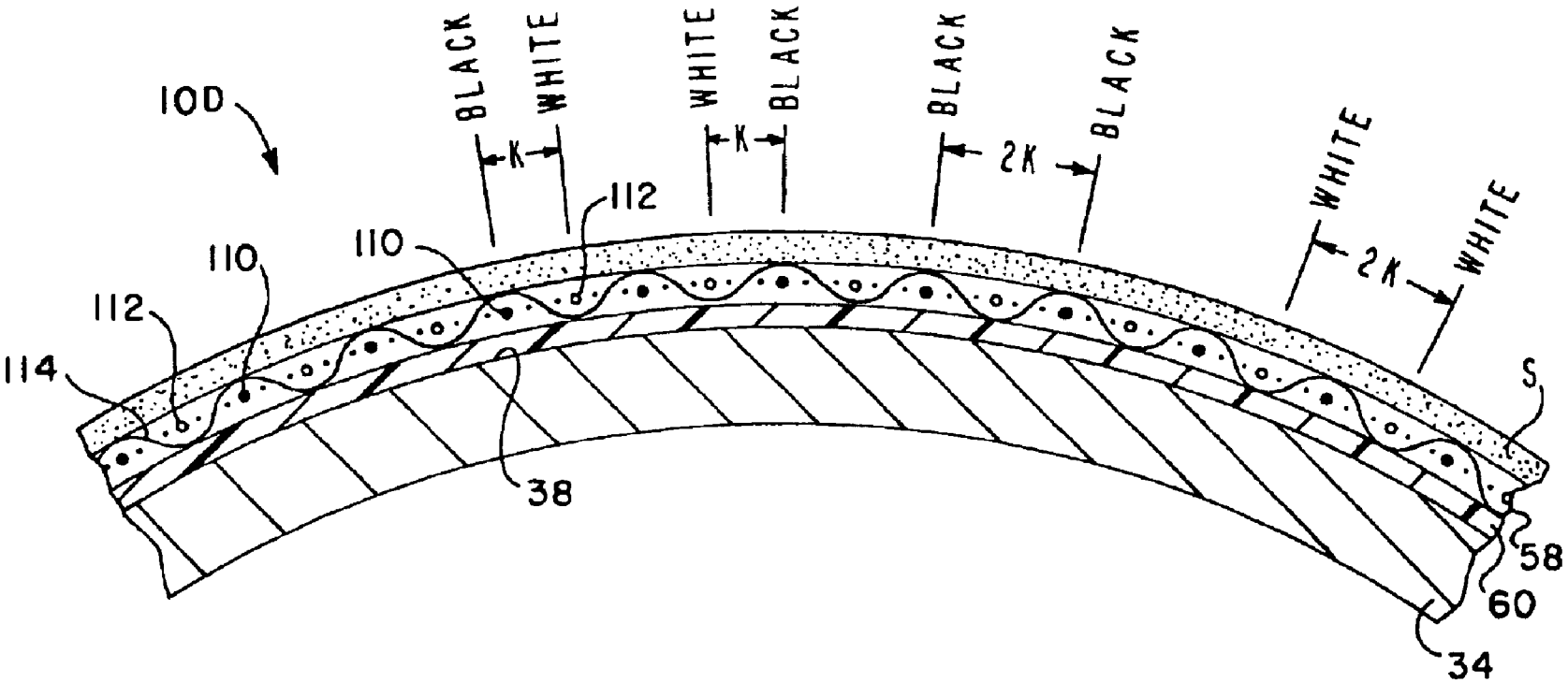
FIG. 6 is an enlarged sectional view, partially broken away, of the delivery cylinder of FIG. 2 having a low friction, conductive cylinder base covering in the form of a layer of fluorinated polymer resin.

According to the preferred embodiment of the present invention, the flexible jacket covering 58 is made of a natural material, for example cotton, hemp, wool, silk, linen and the like. Best results have been obtained by using 40 mesh woven fabric, for examplecotton cheesecloth having a weave of 32 warp×28 weft (fill). Moreover, the cotton cheesecloth is bleached, dyed, treated with an ink-repellent compound such as SCOTCHGUARD® and treated with an anti-static ionic polymer compound, or is otherwise rendered conductive. For example, the cotton cheesecloth material can be rendered conductive by weaving one or more conductive strands 110, 112 in the weft (fill) position and also weaving one or more conductive strands 114, 116 in the warp position, preferably across the entire length and width of the flexible jacket covering as shown in FIG. 4 and FIG. 6.

In the preferred embodiment, the flexible fabric material is pre-stretched so that it substantially resists elongation in response to a tension force applied to the jacket covering by smoothing hand pressure with its elastic recovery being less than about two percent (2%) of its relaxed length in response to tensino induced by light, smoothing hand pressure applied to the jacket covering. Preferably, the flexible fabric material has an ASTM Strength and Elongation rating (for a one inch by six inch sample) that does not exceed about six percent (6%) in warp elongation, with breakage occurring in warp at about seven percent (7%) elongation, and does not exceed about eleven percent (11%) in weft (fill) elongation, with breakage occurring in weft at about twelve percent (12%) elongation.

According to an alternative embodiment, the woven strands or threads are strands of polymers or co-polymers selected from the group including polyesters, polyacrylates, polyolefins, polyimides and polyamides.

Conductivity of the strands or threads is obtained in one embodiment by impregnating or otherwise treating the strands or threads with an anti-static ionic compound selected from the group including ammonium salts, polyglycerol esters and sorbitan esters. Alternatively, the strands are rendered conductive by applying a conductive fluropolymer resin coating on each strand. In the preferred embodiment shown in FIG. 4 and FIG. 6, the conductive weft (fill) strands are designated 110, 112 and the conductive warp strands are designated 114, 116.

Preferably, at least one weft (fill) strand 110 has; a color that contrasts with the color of at least one other strand of the weave, thereby defining at least one contrasting stripe. Preferably, multiple strands 110 having a black color are interwoven with multiple white strands 112, thereby defining black alignment stripes 110 and white alignment stripes 112 at least at the gripper edge and the tail edge of the flexible jacket covering 58. Strands or threads having another contrasting color., such as blue, are also interwoven to define a blue background field. Moreover, the black alignment stripes 110 are separated with respect to the white alignment stripes by a spacing distance K, with the black alignment stripes 110 alternating with the white alignment stripes 112, and with adjacent black and white alignment stripes being separated by the spacing distance K. The spacing distance K in this exemplary embodiment is one-half inch (1.3 cm). Other spacing distances can be utilized, depending upon press clearances and the desired amount of end play K as shown in FIG. 3. It will be appreciated that the provision of the containing stripes is preferred for ease of attachment and alignment of the ink repellent, conductive flexible jacket covering 58 on the delivery cylinder 10D, but are not strictly necessary for the successful practice of the invention.

According to another aspect of the present invention, the flexible jacket covering 58 can be constructed entirely of natural threads, strands or fibers, and can be rendered electrically conductive by impregnating the woven material with an ionic polymer selected from the group including polyacrylic acid polymers and polyammonium polymers. Alternatively, the flexible jacket covering can be rendered conductive by forming at least one or more of the strands of a conductive metal wire, for example a bare copper filament. As previously discussed, the conductive elements of the flexible jacket covering are preferably uniformly distributed throughout the body of the flexible jacket covering.

Referring again to FIG. 3, the flexible jacket covering 58 when properly installed in the operative position is movable by and end play distance K of about one-sixteenth inch (about 2 mm) to about one inch (about 2.54 cm) from either the gripper edge 38A or the tail edge 38B in response to light, smoothing hand pressure applied to the flexible jacket covering. The reference K indicates the movability or "end play" of the flexible jacket covering 58 relative to the cylinder gripper edge 38A and the cylinder tail edge 38B.

The woven strands or threads define a lattice pattern, and the black conductive strands 110 are separated by a spacing distance 2K with respect to each other. The lattice pattern preferably is of a checkerboard design, but other designs such as herringbone or the like can be used to good advantage.

In the preferred embodiment (FIG. 4), the strands are woven in a rectangular grid lattice pattern, with the spacing distance between adjacent strands being at least ten times the diameter of either adjacent strand, thereby defining an open grid pattern.

Figure 11:
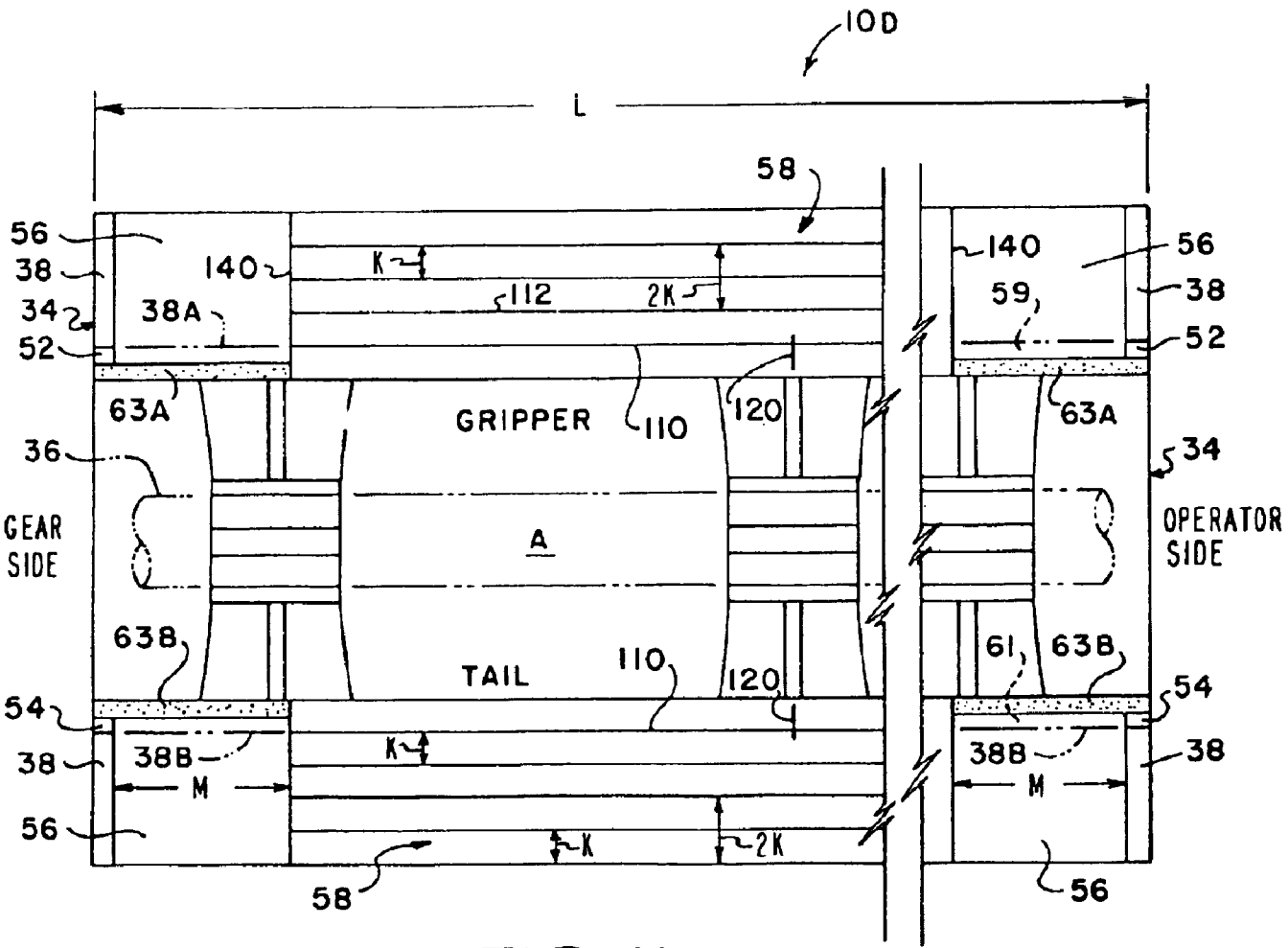
FIG. 11 is a top plan view of the low friction, conductive cylinder base covering and the ink repellent, conductive flexible jacket covering having reduced length, alignment stripes and center alignment marks movably secured to the delivery cylinder of FIG. 2.

Preferably, the flexible jacket covering 58 is attached in an operative position as shown in FIG. 3 and FIG. 11 with an equal amount of end play K, at the cylinder gripper end and at the cylinder tail end, so that the flexible jacket covering is precisely centered circumferentially as well as longitudinally over the delivery cylinder surface 38.

According to an important embodiment of the present invention, the flexible jacket covering 58 is rendered conductive by treating it with an anti-static ionic polymer compound. That is, the flexible jacket covering 58 is treated by soaking the flexible jacket covering in an aqueous solution of an anti-static ionic polymer compound, or by spraying the aqueous solution of anti-static ionic polymer compound onto the flexible jacket covering, or by impregnating the threads or strands with the aqueous anti-static ionic compound prior to weaving.

The anti-static compound preferably comprises an aqueous solution of an ionic polymer selected from the group including ammonium salts, polyglycerol esters and sorbitan esters.

Referring again to FIG. 2, FIG. 3, and FIG. 11, a suitable method of attaching the low friction, conductive cylinder base covering 56 and the ink repellent, conductive flexible jacket covering 58 to the transfer cylinder 10 is illustrated. The low friction conductive cylinder base covering 56 is held in tension against the bare cylinder surface 38 by adhesive deposits 59, 61. After the low friction, conductive cylinder base covering 56 has been secured in place, the flexible, ink repellent conductive jack et covering 58 is movably disposed over the low friction, conductive cylinder base covering 56, with its end portions being secured to the gripper flange portion 54 and the tail flange portion 34B by VELCRO® fastener strips 63A, 63B, respectively (FIG. 2). Alternatively, the VELCRO® fastener strips 63A, 63B are attached to the cylinder base covering 56 as showin in FIG. 3.

Another important aspect of the present invention concerns reducing the coefficient of friction of the support surface 38 of the delivery cylinder 34. The improved cylinder base support surface has a coefficient of friction less than the frictional coefficient of the bare cylinder surface 38 such as may be provided by coating the external surface 38 of the cylinder 34 with a fluoropolymer as taught by U.S. Pat. No. 3,791,644, but which according to the present invention is also rendered electrically conductive (FIG. 6). Moreover, the cylinder base covering 56 of FIG. 14 has structurally differentiated surface portions that reduce the amount of surface area for frictional contact with the flexible jacket covering 58. Although the combination of the fluoropolymer coating described in my U.S. Pat. No. 3,791,644, together with an ink repellent flexible jacket covering as described in my U.S. Pat. No. 4,402,267 provides improved performance, it has been discovered that the radially projecting surface portions of the embodiments of FIGS. 12, 13, 14 and 15 provide improved, low frictional slip surfaces that perform substantially better in reducing accumulation of ink deposits on the surface of the conductive, ink repellent flexible jacket covering 58.

In accordance with another aspect of the present invention, a conductive cylinder base covering 60 having a low coefficient of friction is formed of an electrically conductive resin compound, preferably a fluropolymer containing a conductive agent, for example carbon black, and is applied directly to the delivery cylinder surface 38 in a thin layer or coating 60, as shown in FIG. 6. This low friction, conductive embodiment provides a remarkable improvement in the transferring of freshly printed sheet material as it is transferred by the transfer cylinder 10 and/or the delivery cylinder 10D.

A preferred conductive composition for the coating layer 60 is a polytetrafluoroethylene (PTFE) resin made under the trademark XYLAN by the Whitford Corporation, Westchester Pa., impregnated with carbon black. A satisfactory coating type is XYLAN 1010 composite coating material which is curable at low oven temperatures, for example 250° F. (121° C.).

The preparation of the low friction, conductive cylinder base covering 60 as described provides a substantially glazed surface having a low coefficient of friction of about 0.110, which is semi-conductive (surface resistivity preferably about 75,000 ohms/square) and also provides for ease of movement of the ink repellent, flexible jacket covering 58 when the same is attached to the delivery cylinder 10D. Although the low friction, conductive fluoropolymer coating material 60 is particularly advantageous, it is contemplated that other conductive coatings can be applied to the transfer and/or delivery cylinder surface 38 to produce a comparable low friction, conductive support surface for the ink repellent, conductive flexible jacket covering 58.

Figure 5:
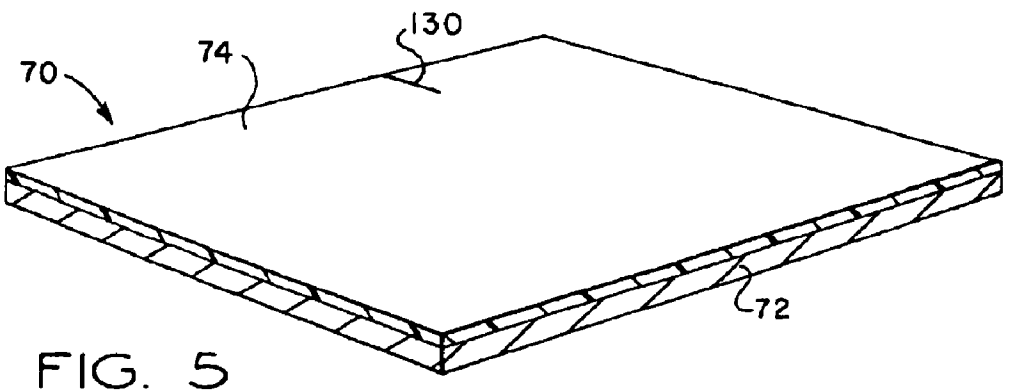
FIG. 5 is a partial perspective view of a low friction, conductive cylinder base covering having a center alignment mark.

Referring now to FIG. 5, a composite embodiment of the low friction conductive cylinder base covering is illustrated. In this embodiment, a low friction, conductive cylinder base covering 70 includes a metal foil carrier sheet 72, constructed of a malleable metal such as aluminum, copper, zinc or the like. The surface of the conductive carrier sheet 72 is covered by a layer 74 of a fluoropolymer resin that contains a conductive agent, for example polytetrafluoroethylene resin (PTFE) containing carbon black, as previously specified.

Figure 7:
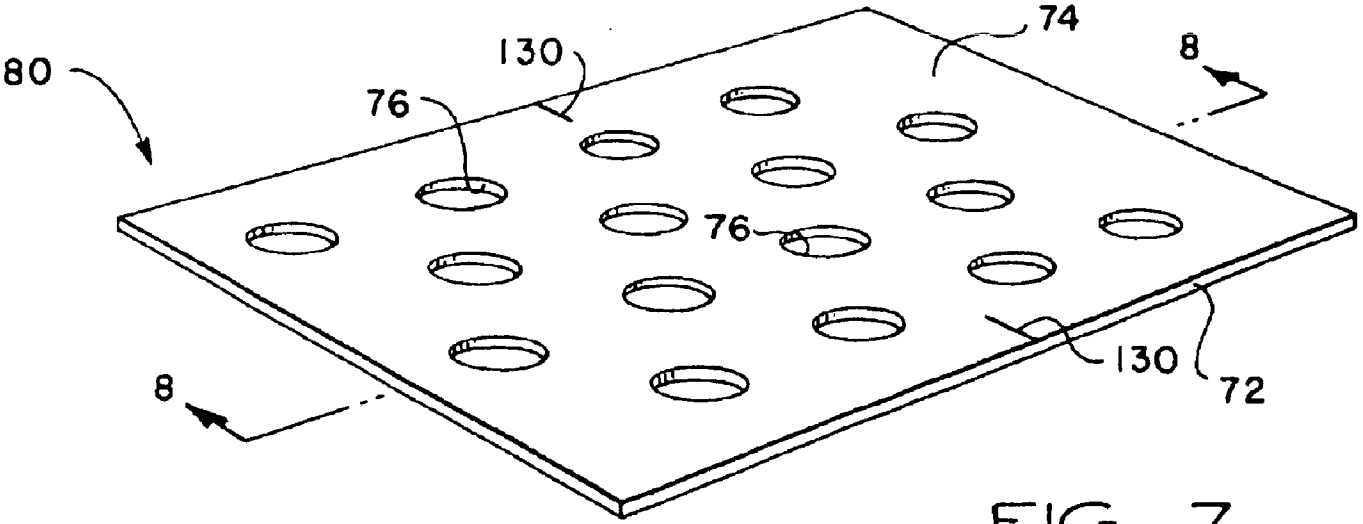
FIG. 7 is a perspective view showing an alternative embodiment of a low friction, conductive cylinder base covering having cut-out openings and center alignment marks.
Figure 8:
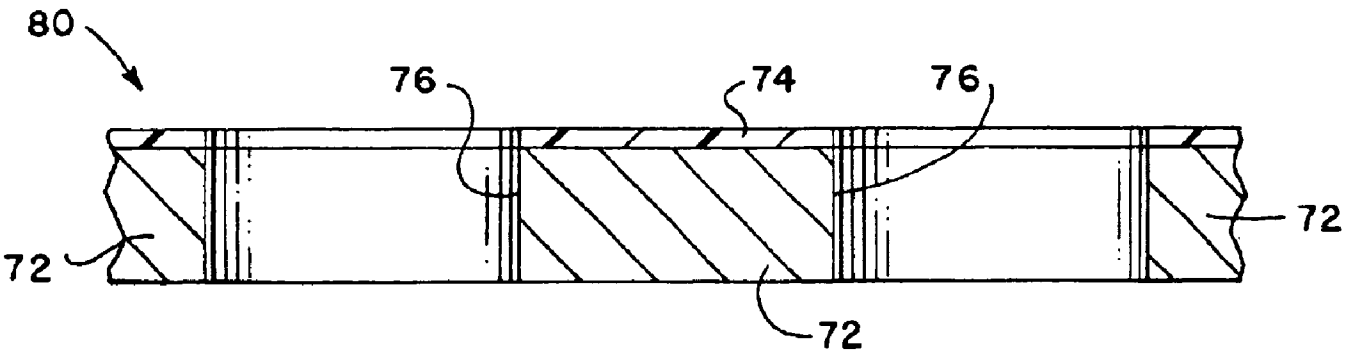
FIG. 8 is a partial sectional view showing the conductive cylinder base covering of FIG. 7 taken along the line 8—8 of FIG. 7.

In the alternative embodiment shown in FIG. 7 and FIG. 8, a low friction, conductive cylinder base covering 80 includes the base carrier sheet 72 and the low friction, conductive coating layer 74 that are completely intersected by multiple bores or openings 76. The purpose of the bores or openings 76 is to reduce the surface area for contact with the flexible, ink repellent conductive jacket covering 58, thereby further reducing the frictional drag between the conductive cylinder base covering 80 and the flexible jacket covering 58.

Figure 9:
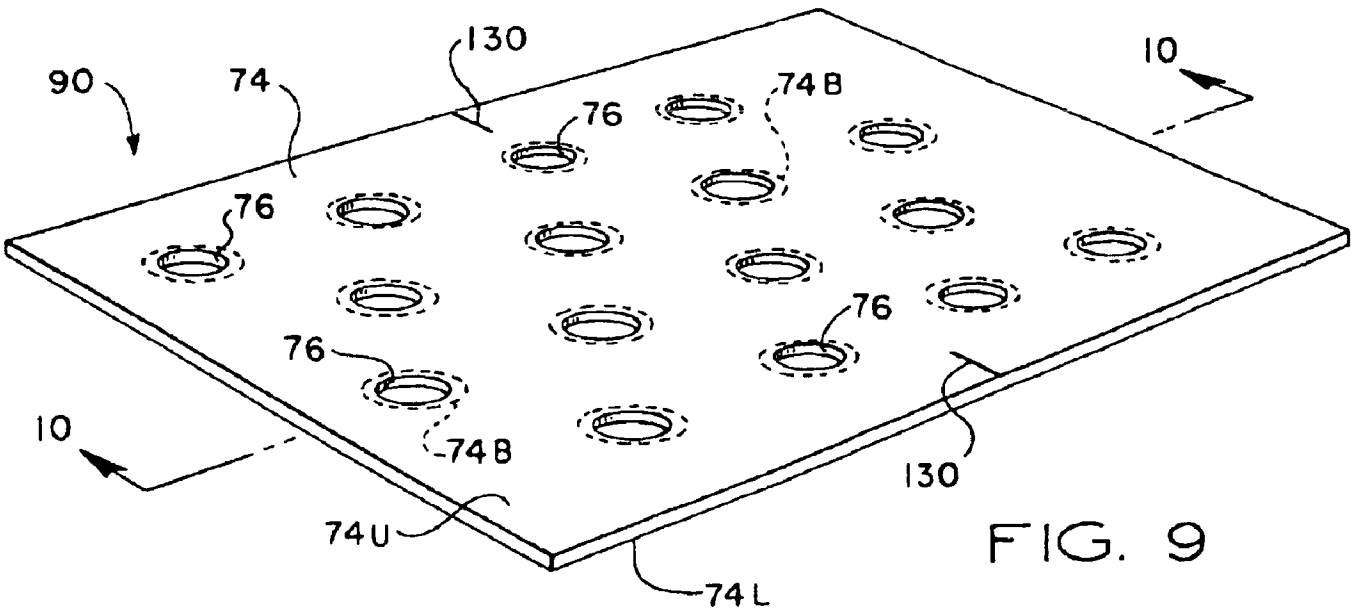
FIG. 9 is a perspective view showing an alternative embodiment of a low friction conductive cylinder base covering having top and bottom low friction, conductive coating layers, cut-out openings and center alignment marks.
Figure 10:
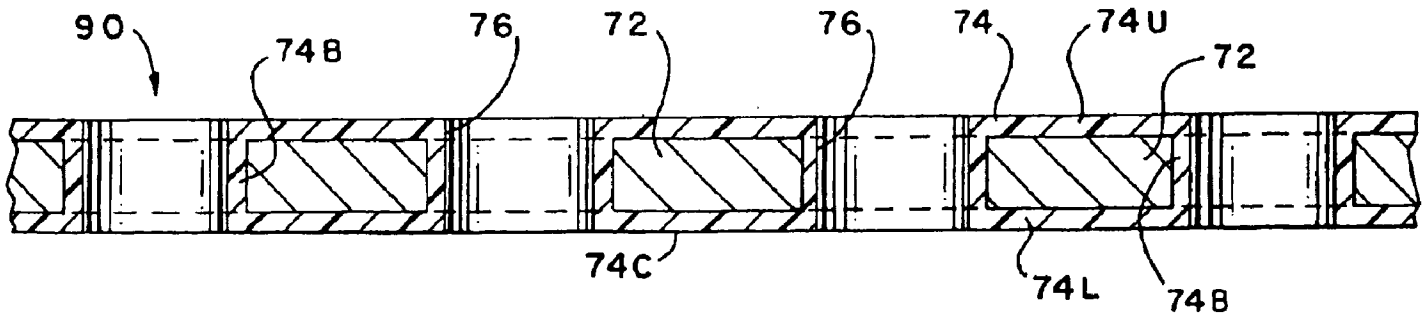
FIG. 10 is a sectional view thereof taken along the line 10—10 of FIG. 9.

Referring now to FIG. 9 and FIG. 10, an alternative cylinder base covering 90 is illustrated in which the same metal foil carrier sheet 72 is covered on both sides with the low friction, conductive coating material 74, with the low friction conductive material 74 extending through the openings 86 and thereby forming a conductive bridge 74B between the upper coating layer 74U and lower coating layer 74L and the cylinder engaging surface 74C. According to this arrangement, a good electrical connection is made between the external surface 38 of the delivery cylinder 10D and the ink repellent, conductive flexible jacket covering 58.

Referring again to FIG. 3 and FIG. 11, the ink repellent, conductive flexible jacket covering 58 is secured over the low friction, conductive cylinder base covering 56 to the flanges 52 and 54 by the VELCRO fastener strips 63A, 63B. Other suitable fastening means include mechanical clamps, double sided adhesive tape, tack strips, magnetic strips and the like. The ink repellent, anti-static flexible jacket covering 58 is attached movably so that with light smoothing hand pressure, the ink repellent, anti-static flexible jacket covering 58 can be moved freely and easily over the surface of any of the low friction, conductive cylinder base covering embodiments in all directions by at least one-sixteenth inch (1.5 mm) to approximately one inch (2.54 cm) deflection or more.

Figure 12:
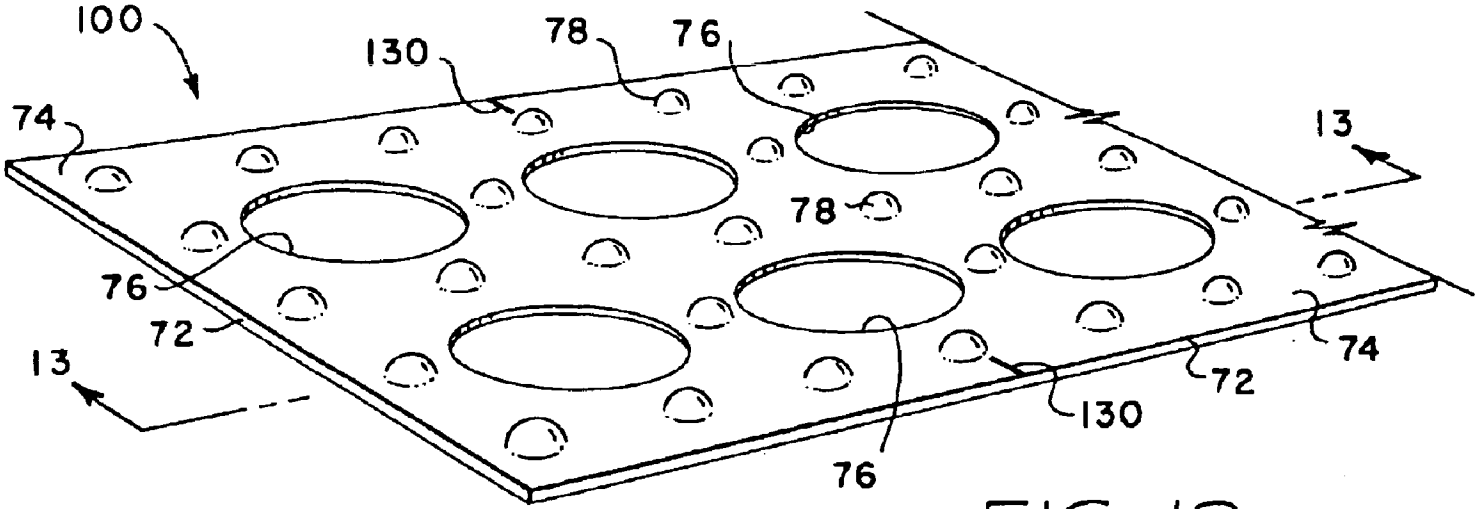
FIG. 12 is a perspective view of a low friction, conductive cylinder base covering also having center alignment marks and openings separated by radially projecting nodes.
Figure 13:
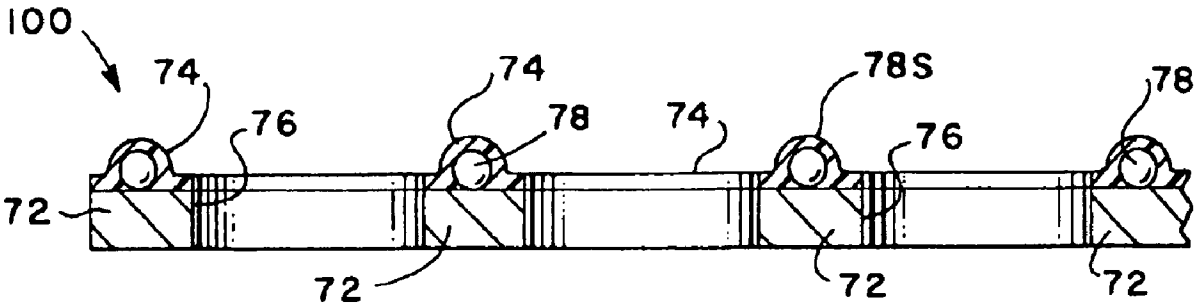
FIG. 13 is a sectional view thereof, taken along the line 13—13 of FIG. 12.

Referring now to FIG. 12 and FIG. 13, an alternative embodiment of a conductive, low friction cylinder base covering 100 is illustrated. In this alternative embodiment, a cylinder base covering 100 includes a carrier sheet 72 formed of a foil or thin sheet of metal such as aluminum, copper, or stainless steel. According to an important aspect of this alternative embodiment, multiple nodes or radial projections 88 are disposed on the engaging side of the carrier sheet 72. Each node 88 has a curved substrate engageable surface 88S which is aligned with the curved transfer path of the substrate S.

Preferably, the nodes 88 and the surface of the carrier sheet 72 are covered by a layer 84 of a conductive, low friction resin compound, for example, a fluoropolymer impregnated with a conductive agent such as carbon black or graphite. Polytetrafluoroethylene (PTFE) impregnated with carbon black is preferred for this embodiment, and is applied in a layer directly onto the surface of the carrier sheet 72 as previously described. The nodes 88 have a radial projection with respect to the carrier sheet 72 of approximately four ails (0.1 mm) with a circumferential spacing between each node of approximately two mils (0.05 mm). The carrier sheet 82 is mounted directly onto the supporting surface 38 of the cylinder 34 so that good electrical contact is made. The low friction, conductive coating 84 is formed directly on the carrier sheet, whereby electrostatic charges delivered by the freshly printed sheets S to the ink repellent, flexible conductive jacket covering 58 are conducted away from the flexible jacket covering 58 and are conducted through the carrier sheet 72 into the cylinder body 34 and discharged into the grounded press frame 14.

The carrier sheet 72 should have a gauge thickness that is sufficient to provide strength and dimensional stability and yet be flexible enough to be easily secured around the transfer cylinder 34 without creasing. Generally, gauge thicknesses in the range of about 2 mils (0.05 mm) to about 24 mils (0.6 mm) are suitable, depending on press clearance and press design.

Referring again to FIGS. 12 and 13, another advantage provided by the node embodiment is reduced surface area contact between the flexible, ink repellent conductive jacket covering 58 and the low friction, conductive cylinder base covering 100. Because of the curved configuration of the nodes 88 and the node spacing, there is less surface area for contact by the ink repellent, conductive flexible jacket covering 58. Consequently, static clinging is completely eliminated and the force of frictional engagement is substantially reduced, thus permitting completely free movement of the ink repellent, conductive flexible jacket covering 58 relative to the low friction, conductive cylinder base covering 100. Additionally, the reduced frictional engagement results in a longer service life for both the ink repellent, conductive flexible jacket covering 58 and for the low frictional, conductive cylinder base covering.

According to the alternative cylinder base covering 100 embodiment as shown in FIGS. 12 and 13, the openings 76 are larger and the conductive carrier sheet 72 has multiple conductive beads or nodes 78 attached to the surface of the conductive metal foil sheet 72. The surface of the low friction, conductive carrier sheet 72 and the beads or nodes 78 are covered by the low friction, conductive layer 74.

The conductive beads or nodes 78 have a diameter of approximately 6 mils (0.15 mm), and the thickness of the low friction, conductive coating layer 74 is approximately 2 mils (0.05 mm). Preferably, the coated beads 78 are arranged in a rectilinear grid pattern and are circumferentially spaced from the adjacent openings 76 by approximately 3 mils (0.07 mm). The gauge thickness of the conductive carrier sheet 72 is in the range of approximately 2 mils (0.05 mm) to approximately 24 mils (0.6 mm)., depending on press clearance and design.

The woven embodiment (FIGS. 3,14, 15), the metal foil embodiments (FIGS. 5, 7, 8, 9 and 10) and the node embodiment (FIGS. 12, 13) are each effective for reducing the amount of surface for contact with the flexible jacket covering 58. For example, the overlapping warp and weft (fill) strands 56A, 56B of the woven embodiment (FIGS. 14, 15) provide a lattice-like framework of radially projecting portions that reduce the surface area for frictional engagement by the ink repellent, conductive flexible jacket covering 58. The low friction, conductive support function is also provided by the radially projecting node embodiment of FIGS. 12 and 13.

Both the woven conductive cylinder base covering embodiment (FIGS. 3,14, 15) and the composite conductive base layer embodiment (FIGS. 5,7, 8, 9, 10, 12 and 13) have reduced ink marking in high speed printing presses and have also (in combination with the ink repellent, conductive flexible jacket covering 58) eliminated depressions and indentations in the freshly printed sheets.

An additional advantage provided by the foregoing low friction, conductive base cylinder embodiments is that the structurally differentiated and radially projecting surface portions provided by the woven material and by the nodes concentrate or focus the area of electrostatic discharge between the conductive, ink repellent flexible jacket covering and the low friction, conductive cylinder base covering. The raised or projecting surfaces associated with the woven material and the nodes provide reduced area discharge points or electrostatic precipitation points where the electric field intensity is increased, thus enhancing the conduction or transfer of electrostatic charges from the flexible, ink repellent and anti-static jacket covering 58 to the low frictional conductive cylinder base covering and into the cylinder 34 and the grounded press frame 14.

The problems caused by the stretchability of the original SUPER BLUE® fabric covering have been solved, according to the present invention, by forming the flexible jacket covering 58 of a pre-stretched fabric material, that has been treated with an ink repellent compound and treated with an anti-static compound, or otherwise made electrically conductive, and pressing the flexible jacket covering flat and pre-cutting the covering to a size having length and width dimensions corresponding with the smallest sheet size that is expected to be printed, for example in presses having a tight sheet clearance of about 40 mils (about 1 mm) or less.

Referring to FIG. 11, the flexible jacket covering 58 has been pre-cut to precise length and width dimensions and is secured to the delivery cylinder 10D over the cylinder base covering 56. The flexible jacket covering 58 includes one or more alignment stripes 110 and one or more center alignment marks 120 for easily and precisely securing the flexible jacket covering over and in alignment with the gripper edge 38A and the tail edge 38B, respectively, of the delivery cylinder 10D as shown in FIG. 3 and FIG. 11. Referring to FIG. 14, the cylinder base covering 56 also has one or more center alignment marks 130 for exact alignment with the flexible jacket covering center alignment marks 120 when the flexible, striped jacket covering 58 is properly secured to the delivery cylinder 10A in the operative position, for example as shown in FIG. 3 and FIG. 11. Likewise, the bare support surface 38 of the cylinder rim 34 has one or more center alignment marks 135 that are located in the exact center of the length of the cylinder rim 34, and also preferably extend onto the cylinder flanges 52, 54 as shown in FIG. 2.

Moreover, in this particular embodiment, the length of the flexible jacket covering 58 is pre-cut to be substantially the same as or slightly less than the length of the smallest sheet S which is to be printed. It will be apparent from FIG. 11 that the flexible jacket covering 58 does not cover the entire cylinder base covering 56, and that marginal side surfaces M of the cylinder base covering 56 are exposed on opposite sides of the flexible jacket covering. According to this embodiment, all of the flexible jacket covering 58 is covered by the smallest size freshly printed sheet S as the sheet is transferred. Consequently, there are no free side edge portions of the flexible jacket covering 58 that can slap against the impression cylinder 26.

The compact, reduced-length flexible jacket covering embodiment 58 shown in FIG. 11 is intended for use in press installations in which the clearance between the impression cylinder 26 and the delivery cylinder 10D or transfer cylinder 10 is less than about 40 mils (about 1 mm). For other presses, where the clearance between the impression cylinder and the delivery cylinder or transfer cylinder is substantially larger, for example up to one inch (2.54 cm) or more, the pre-stretched, pressed flat flexible jacket covering 58 is cut to the full base cylinder covering length and will not slap against the impression cylinder. Because of the pre-stretched, pressed flat condition of the flexible jacket covering, the marginal sides of the flexible jacket covering cannot deflect enough to contact or slap the impression cylinder. In an alternative embodiment, the full size flexible jacket covering 58 of the present invention extends over the operator side edge and the gear side edge, as well as the gripper and tail edges of the cylinder 34, with all side portions of the jacket covering 58 being secured to the cylinder by VELCRO® fasteners or the like, as shown in FIG. 3 and FIG. 11.

When the pre-stretched, pressed flat flexible jacket covering 58 is cut to the smallest size sheet to be printed, it has been discovered that threads on the trimmed edges will unravel or fray and contact a full sized freshly printed sheet. Consequently, the frayed edges will cause marking and smearing on a full sized freshly printed sheet. This problem is solved by applying a binder 140 (FIG. 11) to the trimmed edge portions on the gear side and on the operator side of the flexible jacket covering 58 to bind the loose end threads together, thus preventing fraying after extended use.

Figure 16:
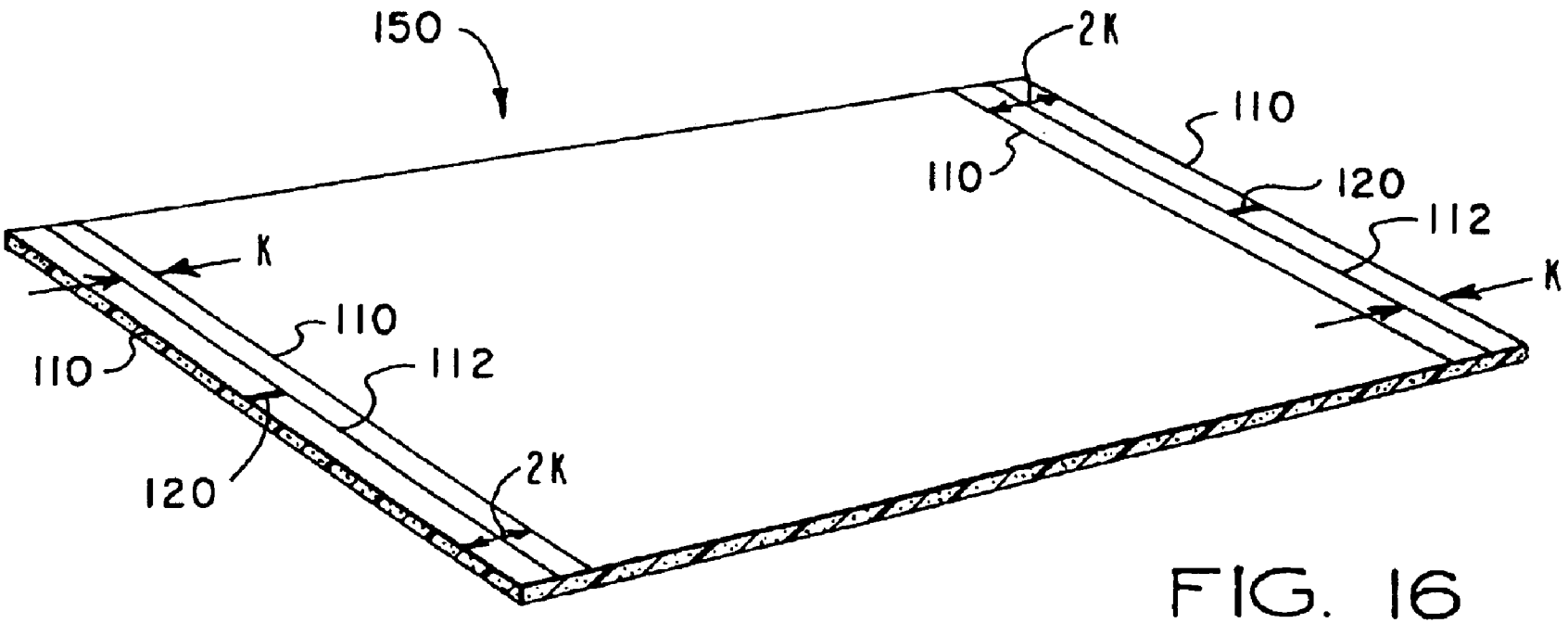

An alternative embodiment of an ink repellent, electrically conductive flexible jacket covering 150 is shown in FIG. 16. In this embodiment, the flexible jacket material is made of a synthetic polymer resin, preferably polyester foam. The foam material is treated with an ink repellent compound and with an electrically conductive compound so that it resists wetting by ink and also conducts static electrical charges.

Technical Advantages of the Invention

The present invention provides a substantially improved yet simple, inexpensive and reliable transfer cylinder and flexible jacket covering that support the freshly printed surface of a substrate, without smearing or marking the printed surface and without damaging the printed material. The improved transfer cylinder of the present invention is easily installed on any printing press. The ink repellent, anti-static (conductive) flexible jacket covering is easily installed and replaced quickly with the aid of the alignment stripes and center alignment marks. Moreover, the flexible jacket covering is pre-stretched, pressed flat and pre-cut to precise length and width dimensions. Once properly installed with the aid of the center alignment marks and stripes, the flexible jacket covering of the present invention does not require any re-adjustment or trimming.

The ink repellent, conductive flexible jacket covering and the underlying low coefficient of friction, conductive cylinder base covering are electrostatically neutralized with respect to each other, so that the flexible jacket covering remains completely free and movable with respect to the electrically conductive, low friction cylinder base covering on the transfer cylinder. Another beneficial result of the electrostatic neutralizing action is that the conductive, flexible jacket covering becomes more resistant to ink accumulation and encrustation. Yet another advantage of the electrostatically neutralized flexible jacket covering is that is retains its natural flexibility and movability since electrostatic charge accumulation is virtually completely eliminated. Excellent flexibility and movability of the flexible jacket covering are essential so that any movement between the freshly printed substrate and the low friction, conductive cylinder base covering on the transfer cylinder will be gently cushioned by the conductive, ink repellent flexible jacket covering, thus substantially reducing marking and smearing of the freshly printed material.

Because of the selected polymeric materials used in the present invention, the flexible jacket covering will have a longer life span. No re-adjustment is required, thus providing improved operating efficiencies. Since the fluorocarbon polymer surface of the conductive cylinder base covering is both oleophobic and hydrophobic, it resists wetting. It is not necessary to wash the low friction, conductive cylinder base covering since the ink does not penetrate the ink repellent conductive flexible jacket covering. The flexible, ink repellent conductive jacket covering functions as an apron and thus prevents the transfer of ink onto the underlying low friction, conductive cylinder base covering, further eliminating maintenance time and labor, while improving print quality and increasing productivity. Consequently, there are no contaminated clean-up rags to be handled and cleared, and there are no hazardous waste disposal problems. Because transfer cylinder clean-up is rendered unnecessary by the present invention, the exposure of press room personnel to transfer cylinder clean-up solvents is eliminated.

Moreover, the risk of transfer cylinder clean-up injury to press room personnel is also eliminated since it is not necessary to reach into the cylinders' nip region to clean the transfer cylinder base support surface.

Also, the fluorocarbon polymer material used as the cylinder base covering is resistant to attack by commonly used press room chemicals.

Removal of the static charges from the freshly printed sheets makes sheet handling easier at the delivery end of the press. By eliminating the electrostatic charges on freshly printed sheets, the printed sheets are more easily jogged to achieve a uniform stack of freshly printed sheets. Another significant advantage is that offset or set-off is reduced because the electrostatically neutralized sheets do not cling together and are delivered gently and stacked uniformly in the delivery stacker.

What is claimed is:

1. In a printing unit having a transfer cylinder for transferring a freshly printed substrate, and having a flexible jacket covering attached to the transfer cylinder for engaging the freshly printed substrate as it is transferred over the transfer cylinder, characterized in that the flexible jacket covering comprises a sheet of [fabric] *flexible* material [that is pre-stretched, pressed flat, pre-cut to predetermined length and width dimensions, and] having *visual* alignment means for *visually aligning during* attaching the flexible jacket covering to the transfer cylinder in an operative position *without use of a spotting device* wherein the flexible jacket covering is movable relative to the support surface of the transfer cylinder[, with the end play movement of the flexible jacket covering relative to the support surface being substantially the same at each attachment end portion];

*wherein the visual alignment means do not actively participate in physical engagement with other alignment or attachment elements.*

2. The invention as defined in claim 1, wherein the sheet of flexible [fabric] material is treated with an ink-repellent compound.

3. The invention as defined in claim 1, wherein the sheet of flexible [fabric] material is treated with a conductive means or an anti-static means.

4. A flexible jacket in combination with a succession of freshly printed substrates having freshly printed surfaces wherein each freshly printed surface is temporarily supported by contact with the flexible jacket while the substrates are moved along a path, wherein the flexible jacket comprises an individual sheet of flexible fabric material having spaced electrically conductive strands or threads whereby electrical charges delivered to the flexible fabric jacket by the succession of freshly printed substrates may be transferred to an underlying grounded surface for the purpose of reducing ink buildup on the jacket and reducing smearing of fresh ink on the freshly printed surfaces.

5. The flexible jacket of claim 4 wherein said flexible jacket has been treated with a chemical compound that renders said jacket material electrically conductive.

6. The flexible jacket of claim 5 wherein said chemical compound comprises an ionic polymer selected from the group consisting of polyacrylic acid polymers and polyamonium polymers.

7. The flexible jacket of claim 5 wherein said flexible fabric material is wettable by an aqueous solution containing an ionic polymer.

8. The flexible jacket of claim 4 wherein said spaced electrically conductive strands or threads in the jacket comprise strands or threads made of an electrically conductive material.

9. The flexible jacket of claim 8 wherein said spaced electrically conductive strands or threads in the jacket are coated with a conductive material.

10. The flexible jacket of claim 8 wherein the electrically conductive material is selected from a group consisting of metal, carbon black or graphite.

11. The flexible jacket of claim 8 wherein the electrically conductive material comprises a polymer mixed with an electrically conductive material.

12. The flexible jacket of claim 8 wherein at least some of the spaced electrically conductive strands or threads comprise a polymer or copolymer selected from the group consisting of polyesters, polyacrylates, polyolefins, polyimides and polyamides.

13. The flexible jacket of claim 4 wherein the flexible jacket is pre-cut to a predetermined length and width dimension larger tan the size of the succession of freshly printed substrates wherein said dimensions are selected to adapt the jacket for being movably secured to said underlying grounded surface.

14. The flexible jacket of claim 13 wherein the jacket material has been pre-stretched and pressed flat to resist stretching in response to hand applied tension force and contact with the succession of freshly printed substrates.

15. The flexible jacket of claim 4 wherein the flexible jacket is pre-stretched, pressed flat and pre-cut to precise width and length dimension sufficient to support the entire freshly printed surface of the substrates and provided with means for alignment with respect to said underlying grounded surface.

16. The flexible jacket of claim 4 wherein the flexible jacket comprises a weave of warp strands or threads and weft strands or threads, wherein at least one warp strand or thread or at least one weft strand or thread has a color that contrasts with the color of at least one other strand or thread of the weave, thereby defining at least one contrasting alignment stripe.

17. The flexible jacket of claim 4 wherein at least one spaced electrically conductive strand or thread comprises a strand of carbon black and includes a polyester thread wrapped around said strand.

18. The flexible jacket of claim 4 wherein the flexible fabric material of said flexible jacket is prestretched woven material, and characterized by minimal elastic memory such that upon the application of tension force applied by hand to the woven material, the flexible jacket substantially resists elongation and upon release of tension, the amount of recovery is no more than 2% of its relaxed length.

19. The flexible jacket of claim 4 wherein said flexible fabric material is woven from natural material selected from the group consisting of cotton, help, wool, silk and linen.

20. The flexible jacket of claim 4 wherein said flexible fabric material is woven from polymers or copolymers selected from the group consisting of polyesters, polyacrylates, polyolefins, polyimides and polyamides.

21. The flexible jacket of claim 4 wherein said flexible fabric material is impregnated with an ink-repellant compound.

22. A flexible jacket in combination with a succession of freshly printed substrates having freshly printed surfaces wherein each freshly printed surface is temporarily supported by contact with the flexible jacket while the substrates are being moved along a printing path, wherein the flexible jacket comprises an individual sheet of flexible jacket material which has been prestretched, pressed flat and pre-cut to precise width and length dimension sufficient to support the entire freshly printed surface of the substrates, the flexible jacket having a plurality of conductive strands or threads, said conductive strands or threads being disposed in a pattern and being spaced apart with respect to each other whereby electrical charges delivered to the flexible jacket by the succession of freshly printed substrates may be transferred from the flexible jacket for the purpose of reducing ink build up on the jacket and reducing smearing of fresh ink in the freshly printed surfaces.

23. The flexible jacket of claim 22 wherein the material of said flexible jacket is woven material having warp strands or heads and weft strands or threads wherein the material has no noticeable stretching when pulled by hand in the weft direction or in the warp direction.

24. The flexible jacket of claim 23 wherein the warp elongation at break does not exceed about 7% elongation and the weft elongation at break does not exceed about 12% elongation when tested in a 1 inch by 6 inch sample by ASTM procedure applicable to fabrics.

25. The flexible jacket of claim 23 wherein said strands or threads of the woven material are woven in a lattice pattern, where the distance between adjacent strands or threads is about at least 10 times the diameter of adjacent strands or threads.

26. The flexible jacket of claim 25 wherein said lattice pattern comprises a design selected from the group consisting of a herringbone or checkerboard design.

27. The flexible jacket of claim 25 wherein the jacket is woven from strands or threads selected from the group consisting cotton, hemp, wool, silk, linen, polymers, copolymers, polyesters, polyacrylates, polyolefins, polyimides and polyamides.

28. The flexible jacket of claim 22 wherein the spaced electrically conductive strands or threads are formed of a material having a color that contrasts with the color of other strands or threads in the woven material, thereby defining contrasting alignment stripes.

29. The flexible jacket of claim 28 wherein said spaced electrically conductive strands or threads are evenly spaced apart from each other.

30. The flexible jacket of claim 29 wherein the spacing between conductive strands or threads is approximately one-half inch with respect to each other.

31. The flexible jacket of claim 29 wherein at least one conductive strand or thread comprises a strand of copper wire.

32. The flexible jacket of claim 22 wherein said spaced conductive strands or threads comprise a fluoropolymer resin containing a conductive agent.

*33. The invention as defined in claim 1 wherein the end play movement of the flexible jacket covering relative to the support surface is substantially the same at each attachment end portion.*

*34. The invention as defined in claim 1 wherein the sheet of flexible material comprises an open cell polymer foam material.*

*35. In a printing unit having a transfer cylinder for transferring a freshly printed substrate, and having a flexible jacket covering attached to the transfer cylinder for engaging the freshly printed substrate as it is transferred over the transfer cylinder, characterized in that the flexible jacket covering comprises a sheet of flexible material having alignment means for attaching the flexible jacket covering to the transfer cylinder in an operative position wherein the flexible jacket covering is movable relative to the support surface of the transfer cylinder and wherein said flexible jacket covering comprises a sheet of fabric material that is pre-stretched, pressed flat, pre-cut to predetermined length and width dimensions.*

*36. In a printing unit having a transfer cylinder for transferring a freshly printed substrate, and having a flexible jacket covering attached to the transfer cylinder for engaging the freshly printed substrate as it is transferred over the transfer cylinder, characterized in that the flexible jacket covering comprises a sheet of flexible material having alignment means for attaching the flexible jacket covering to the transfer cylinder in an operative position wherein*

*the flexible jacket covering is movable relative to the support surface of the transfer cylinder and the flexible jacket comprises a weave of warp strands or threads and weft strands or threads, and*

*said alignment means comprises at least one warp strand or thread or at least one weft strand or thread having a color that contrasts with the color of at least one other strand or thread of the weave, thereby defining at least one contrasting alignment stripe.*

*37. The invention as defined in claim 36 wherein:*

*said transfer cylinder comprises a gripper edge for engaging a first longitudinal edge of said flexible jacket covering, and*

*said alignment means comprises at least one alignment stripe parallel to said first longitudinal edge.*

*38. The invention as defined in claim 37 wherein:*

*said transfer cylinder comprises a tail edge for engaging a second longitudinal edge of said flexible jacket covering, and*

*said alignment means comprises at least one alignment stripe parallel to said second longitudinal edge.*

*39. The invention as defined in claim 38 wherein:*

*said transfer cylinder has a circumferential dimension between said gripper edge and said tail edge, and*

*the flexible jacket has a dimension between said first and second longitudinal edges greater than said circumferential dimension by an amount sufficient to provide a preselected end play when said first and second longitudinal edges are operatively connected to said gripper edge and tail edge respectively.*

*40. The invention as defined in claim 39, wherein said alignment means comprises a pair of alignment stripes parallel to said first longitudinal edge and a pair of alignment stripes parallel to said second longitudinal edge.*

*41. The invention as defined in claim 40, wherein each pair of alignment stripes are spaced apart by a distance related to said preselected end play, whereby said stripes indicate proper operative positioning of said flexible jacket on said cylinder.*

*42. The invention as defined in claim 41, wherein said preselected end play is from about one-sixteenth inch (about 2 mm) to about one inch (2.54 cm) and each pair of stripes are spaced apart by said preselected end play.*

*43. The invention as defined in claim 39, wherein said alignment means comprises a plurality of alignment stripes between and parallel to said first and second longitudinal edges.*

*44. The invention as defined in claim 43, wherein said alignment stripes are evenly spaced apart from each other by a distance related to said preselected end play.*

*45. The invention as defined in claim 44, wherein said alignment stripes are spaced apart by a distance equal to said preselected end play.*

*46. The invention as defined by claim 43, wherein said alignment means comprises an alignment stripe perpendicular to said longitudinal edges.*

*47. The invention as defined by claim 43, wherein said alignment means comprises a plurality of alignment stripes perpendicular to said longitudinal edges.*

*48. In a printing unit having a transfer cylinder for transferring a freshly printed substrate, and having a flexible jacket covering attached to the transfer cylinder for engaging the freshly printed substrate as it is transferred over the transfer cylinder, characterized in that the flexible jacket covering comprises a sheet of flexible material having visual alignment means for visually aligning during attaching the flexible jacket covering to the transfer cylinder in an operative position without use of a spotting device wherein the flexible jacket covering is movable relative to the support surface of the transfer cylinder and*

*said cylinder comprises at least one centering mark, and*

*said alignment means comprises at least one centering mark,*

*whereby said centering marks indicate a proper operative position of said flexible jacket on said cylinder and wherein the visual alignment means do not actively participate in physical engagement with other alignment or attachment elements.*

*49. A flexible jacket is combination with a succession of freshly printed substrates having freshly printed surfaces wherein:*

*each freshly printed surface is temporarily supported by contact with the flexible jacket while the substrates are moved along a path,*

*the flexible jacket comprises a weave of warp strands or threads and weft strands or threads, and*

*at least one warp strand or thread or at least one weft strand or thread has a color that contrasts with the color of at least one other strand or thread of the weave, thereby defining at least one contrasting alignment stripe.*

*50. The invention as defined in claim 49 wherein said flexible jacket has dimensions sufficient for attachment to a printing unit transfer cylinder in an operative position wherein the flexible jacket is movable relative to a support surface of the transfer cylinder.*

*51. The invention as defined in claim 50, wherein said flexible jacket has first and second longitudinal edges adapted for connection to a gripper edge and a tail edge respectively of said transfer cylinder.*

*52. The invention as defined in claim 51, wherein said flexible jacket comprises at least one first alignment stripe parallel to said first longitudinal edge, said at least one first alignment stripe operating as an indicator of operative positioning of said flexible jacket relative to said gripper edge.*

*53. The invention as defined in claim 51, wherein said flexible jacket comprises at least one second alignment stripe parallel to said second longitudinal edge, said at least one second alignment stripe operating as an indicator of operative positioning of said flexible jacket relative to said tail edge.*

*54. The invention as defined in claim 51, wherein said flexible jacket comprises a plurality of alignment stripes parallel to said longitudinal edges.*

*55. The invention as defined in claim 54, wherein:*

*said flexible jacket has dimensions sufficient to provide a preselected end play when operatively positioned on said transfer cylinder, and*

*said plurality of alignment stripes are spaced apart by a distance related to said preselected end play.*

*56. The invention as defined in claim 55, wherein said preselected end play is from about one-sixteenth inch (about 2 mm) to about one inch (2.54 cm) and said plurality of alignment stripes are spaced apart by said preselected end play.*

*57. The invention as defined in claim 54, wherein said flexible jacket comprises a plurality of alignment stripes perpendicular to said longitudinal edges.*

*58. The invention as defined in claim 51, wherein said flexible jacket has dimensions sufficient to provide a preselected end play when operatively positioned on said transfer cylinder.*

*59. The invention as defined in claim 58, wherein said flexible jacket comprises a pair of first alignment stripes parallel to said first longitudinal edge and spaced apart by a distance related to said preselected end play, whereby said stripes indicate proper operative positioning of said flexible jacket on said cylinder.*

*60. The invention as defined in claim 59, wherein said flexible jacket comprises a pair of second alignment stripes parallel to said second longitudinal edge and spaced apart by a distance related to said preselected end play, whereby said stripes indicate proper operative positioning of said flexible jacket on said cylinder.*

*61. The invention as defined in claim 60, wherein said preselected end play is from about one-sixteenth inch (about 2 mm) to about one inch (2.54 cm) and each pair of alignment stripes are spaced apart by said preselected end play.*

*62. The invention as defined in claim 50 wherein:*

*said cylinder comprises at least one centering mark, and*

*said alignment stripe comprises at least one centering mark,*

*whereby said centering marks indicate a proper operative position of said flexible jacket on said cylinder.*

*63. In a printing unit having a transfer cylinder for transferring a freshly printed substrate, and having a flexible jacket covering attached to the transfer cylinder for engaging the freshly printed substrate as it is transferred over the transfer cylinder, characterized in that the flexible jacket covering comprises a sheet of flexible material marked with at least one visual alignment stripe for visually aligning during attaching the flexible jacket covering to the transfer cylinder in an operative position wherein the flexible jacket covering is movable relative to the support surface of the transfer cylinder;*

*wherein the visual alignment stripe does not actively participate in physical engagement with other alignment or attachment elements;*

*wherein the visual alignment stripe presents an overall visual appearance of an extended stripe.*

*64. The invention of claim 63 wherein the alignment stripe extends across the entire length or width of the sheet of flexible material.*

*65. The invention of claim 63 wherein the alignment stripe extends across less than the entire length or width of the sheet of flexible material while still presenting the overall visual appearance of an extended stripe.*

*66. The invention of claim 63 wherein the alignment stripe has a discontinuous appearance while still presenting the overall visual appearance of an extended stripe.*

*67. The invention of claim 63 wherein the at least one alignment stripe comprises an element of a checkerboard or herringbone pattern while still presenting the overall visual appearance of an extended stripe.*

*68. The invention as defined in claim 63 wherein the sheet of flexible material has dimensions sufficient for attachment to a printing unit transfer cylinder in an operative position wherein the sheet of flexible material is movable relative to a support surface of the transfer cylinder.*

*69. The invention as defined in claim 68, wherein the sheet of flexible material has first and second longitudinal edges*

*adapted for connection to a gripper edge and a tail edge respectively of said transfer cylinder.*

*70. The invention as defined in claim 69, wherein the sheet of flexible material is marked with at least one first alignment stripe parallel to the first longitudinal edge, the at least one first alignment stripe operating as an indicator of operative positioning of the sheet of flexible material relative to the gripper edge.*

*71. The invention as defined in claim 69, wherein the sheet of flexible material is marked with at least one second alignment stripe parallel to the second longitudinal edge, the at least one second alignment stripe operating as an indicator of operative positioning of the sheet of flexible material relative to said tail edge.*

*72. The invention as defined in claim 69, wherein the sheet of flexible material is marked with a plurality of alignment stripes parallel to the longitudinal edges.*

*73. The invention as defined in claim 72, wherein the sheet of flexible material is marked with a plurality of alignment stripes perpendicular to the longitudinal edges.*

*74. The invention as defined in claim 69, wherein the sheet of flexible material has dimensions sufficient to provide a preselected end play when operatively positioned on the transfer cylinder.*

*75. The invention as defined in claim 69 wherein:*

*the cylinder is marked with at least one centering mark, and*

*the alignment stripe comprises at least one centering mark while still presenting the overall visual appearance of an extended stripe,*

*whereby the centering marks indicate a proper operative position of the sheet of flexible material on the cylinder.*

*76. In a printing unit having a transfer cylinder for transferring a freshly printed substrate, and having a flexible jacket covering attached to the transfer cylinder for engaging the freshly printed substrate as it is transferred over the transfer cylinder, characterized in that the flexible jacket covering comprises a sheet of flexible material marked with at least one alignment stripe for attaching the flexible jacket covering to the transfer cylinder in an operative position wherein the flexible jacket covering is movable relative to the support surface of the transfer cylinder, wherein the sheet of flexible material is a woven fabric and the alignment stripe comprises at least one thread which contrasts with other threads in the fabric.*

*77. The invention of claim 76 wherein the at least one thread has a color which contrasts with other threads in the fabric.*

*78. The invention of claim 76 wherein the at least one thread contrasts with an adjacent thread in the fabric.*

*79. In a printing unit having a transfer cylinder for transferring a freshly printed substrate, and having a flexible jacket covering attached to the transfer cylinder for engaging the freshly printed substrate as it is transferred over the transfer cylinder, characterized in that the flexible jacket covering comprises a sheet of flexible material marked with at least one alignment stripe for attaching the flexible jacket covering to the transfer cylinder in an operative position wherein the flexible jacket covering is movable relative to the support surface of the transfer cylinder;*

*wherein the sheet of flexible material has dimensions sufficient for attachment to a printing unit transfer cylinder in an operative position wherein the sheet of flexible material is movable relative to a support surface of the transfer cylinder;*

*wherein the sheet of flexible material has first and second longitudinal edges adapted for connection to a gripper edge and a tail edge respectively of said transfer cylinder;*

*wherein the sheet of flexible material is marked with a plurality of alignment stripes parallel to the longitudinal edges;*

*wherein the sheet of flexible material has dimensions sufficient to provide a preselected end play when operatively positioned on the transfer cylinder; and,*

*wherein the plurality of alignment stripes are spaced apart by a distance related to the preselected end play.*

*80. The invention as defined in claim 79, wherein the preselected end play is from about one-sixteenth inch (about 2 mm) to about one inch (2.54 cm) and the plurality of alignment stripes are spaced apart by said preselected end play.*

*81. In a printing unit having a transfer cylinder for transferring a freshly printed substrate, and having a flexible jacket covering attached to the transfer cylinder for engaging the freshly printed substrate as it is transferred over the transfer cylinder, characterized in that the flexible jacket covering comprises a sheet of flexible material marked with at least one alignment stripe for attaching the flexible jacket covering to the transfer cylinder in an operative position wherein the flexible jacket covering is movable relative to the support surface of the transfer cylinder;*

*wherein the sheet of flexible material has dimensions sufficient for attachment to a printing unit transfer cylinder in an operative position wherein the sheet of flexible material is movable relative to a support surface of the transfer cylinder;*

*wherein the sheet of flexible material has first and second longitudinal edges adapted for connection to a gripper edge and a tail edge respectively of said transfer cylinder;*

*wherein the sheet of flexible material has dimensions sufficient to provide a preselected end play when operatively positioned on the transfer cylinder; and,*

*wherein the sheet of flexible material is marked with a pair of first alignment stripes parallel to the first longitudinal edge and spaced apart by a distance related to the preselected end play, whereby the stripes indicate proper operative positioning of the sheet of flexible material on the cylinder.*

*82. The invention as defined in claim 81, wherein the sheet of flexible material is marked with a pair of second alignment stripes parallel to the second longitudinal edge and spaced apart by a distance related to the preselected end play, whereby the stripes indicate proper operative positioning of the sheet of flexible material on the cylinder.*

*83. The invention as defined in claim 82, wherein the preselected end play is from about one-sixteenth inch (about 2 mm) to about one inch (2.54 cm) and each pair of alignment stripes are spaced apart by said preselected end play.*

*84. In a printing unit having a transfer cylinder for transferring a freshly printed substrate, and having a flexible jacket covering attached to the transfer cylinder for engaging the freshly printed substrate as it is transferred over the transfer cylinder, characterized in that the flexible jacket covering comprises a sheet of flexible material having alignment means for attaching with an amount of end play the flexible jacket covering to the transfer cylinder in an operative position wherein the flexible jacket covering is movable relative to the support surface of the transfer cylinder, wherein the alignment means are used both to align the flexible jacket covering with the transfer cylinder and to define the amount of end play.*

*85. The invention as defined in claim 84, wherein the sheet of flexible material is treated with an ink-repellent compound.*

*86. The invention as defined in claim 84, wherein the sheet of flexible material is treated with a conductive means or an anti-static means.*

*87. The invention as defined in claim 84 wherein the sheet of flexible material comprises an open cell polymer foam material.*

*88. The invention as defined in claim 84, wherein*

*said cylinder comprises at least one centering mark, and*

*said alignment means comprises at least one centering mark,*

*whereby said centering marks indicate a proper operative position of said flexible jacket on said cylinder.*

*89. In a printing unit having a transfer cylinder for transferring a freshly printed substrate, and having a flexible jacket covering attached to the transfer cylinder for engaging the freshly printed substrate as it is transferred over the transfer cylinder, characterized in that the flexible jacket covering comprises a sheet of flexible material having alignment means for attaching with an amount of end play the flexible jacket covering to the transfer cylinder in an operative position wherein the flexible jacket covering is movable relative to the support surface of the transfer cylinder wherein*

*the flexible jacket comprises a weave of warp strands or threads and weft strands or threads, and*

*said alignment means comprises at least one warp strand or thread or at least one weft strand or thread having a color that contrasts with the color of at least one other strand or thread of the weave, thereby defining at least one contrasting alignment stripe.*

*90. The invention as defined in claim 89 wherein:*

*said transfer cylinder comprises a gripper edge for engaging a first longitudinal edge of said flexible jacket covering, and*

*said alignment means comprises at least one alignment stripe parallel to said first longitudinal edge.*

*91. The invention as defined in claim 90 wherein:*

*said transfer cylinder comprises a tail edge for engaging a second longitudinal edge of said flexible jacket covering, and*

*said alignment means comprises at least one alignment stripe parallel to said second longitudinal edge.*

*92. The invention as defined in claim 91 wherein:*

*said transfer cylinder has a circumferential dimension between said gripper edge and said tail edge, and*

*the flexible jacket has a dimension between said first and second longitudinal edges greater than said circumferential dimension by an amount sufficient to provide a preselected end play when said first and second longitudinal edges are operatively connected to said gripper edge and tail edge respectively.*

*93. The invention as defined in claim 92, wherein said alignment means comprises a pair of alignment stripes parallel to said first longitudinal edge and a pair of alignment stripes parallel to said second longitudinal edge.*

*94. The invention as defined in claim 93, wherein each pair of alignment stripes are spaced apart by a distance related to said preselected end play, whereby said stripes indicate proper operative positioning of said flexible jacket on said cylinder.*

*95. The invention as defined in claim 94, wherein said preselected end play is from about one-sixteenth inch (about 2 mm) to about one inch (2.54 cm) and each pair of stripes are spaced apart by said preselected end play.*

*96. The invention as defined in claim 92, wherein said alignment means comprises a plurality of alignment stripes between and parallel to said first and second longitudinal edges.*

*97. The invention as defined in claim 96, wherein said alignment stripes are evenly spaced apart from each other by a distance related to said preselected end play.*

*98. The invention as defined in claim 97, wherein said alignment stripes are spaced apart by a distance equal to said preselected end play.*

*99. The invention as defined by claim 96, wherein said alignment means comprises an alignment stripe perpendicular to said longitudinal edges.*

*100. The invention as defined by claim 96, wherein said alignment means comprises a plurality of alignment stripes perpendicular to said longitudinal edges.*

* * * * *

UNITED STATES PATENT AND TRADEMARK OFFICE

CERTIFICATE OF CORRECTION

PATENT NO. : RE 39,305 E
APPLICATION NO. : 10/352334
DATED : September 26, 2006
INVENTOR(S) : Howard W. DeMoore et al.

It is certified that error appears in the above-identified patent and that said Letters Patent is hereby corrected as shown below:

Claim 13, Col. 18, line 17, replace “tan” with -- than --
Claim 23, Col. 19, line 11, replace “heads” with -- threads --
Claim 49, Col. 21, line 19, replace “is” with -- in --

Signed and Sealed this

Twenty-third Day of September, 2008

JON W. DUDAS
*Director of the United States Patent and Trademark Office*